United States Patent
Ihara et al.

(10) Patent No.: US 7,776,476 B2
(45) Date of Patent: Aug. 17, 2010

(54) BATTERY

(75) Inventors: Masayuki Ihara, Fukushima (JP);
Hiroyuki Yamaguchi, Fukushima (JP);
Hiroshi Horiuchi, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1285 days.

(21) Appl. No.: 11/298,162

(22) Filed: Dec. 7, 2005

(65) Prior Publication Data
US 2006/0134528 A1 Jun. 22, 2006

(30) Foreign Application Priority Data
Dec. 10, 2004 (JP) ............ P2004-357815
May 13, 2005 (JP) ............ P2005-141552

(51) Int. Cl.
*H01M 4/58* (2010.01)
(52) U.S. Cl. ............ 429/231.95; 429/329; 429/200; 429/330
(58) Field of Classification Search ........... 429/231.95, 429/329, 200, 330
See application file for complete search history.

(56) References Cited

U.S. PATENT DOCUMENTS 6,884,546 B1   4/2005   Fujita et al.

2006/0154149 A1   7/2006   Arai et al.

FOREIGN PATENT DOCUMENTS

| JP | 62217567 | 9/1987 |
|----|----------|--------|
| JP | 62290071 | 12/1987 |
| JP | 08-306364 | 11/1996 |
| JP | 2002-110235 | 4/2002 |
| JP | 2002-193973 | 7/2002 |
| JP | 2003-137890 | 5/2003 |
| JP | 2004-071159 | 3/2004 |
| JP | 2004-319133 | 11/2004 |
| JP | 2004-342575 | 12/2004 |
| JP | 2005-108724 | 4/2005 |
| JP | 2006-164860 | 6/2006 |
| JP | 09-251861 | 6/2008 |
| WO | WO 01/22519 | 3/2001 |

OTHER PUBLICATIONS

Gabano, Jean-Paul, "Lithium Batteries," Academic Press, 1983, London, New York.

*Primary Examiner*—Jane Rhee
(74) *Attorney, Agent, or Firm*—K&L Gates LLP

(57) ABSTRACT

A battery capable of improving cycle characteristics is provided. A spirally wound electrode body in which a cathode and an anode are wound with a separator in between is included. An electrolytic solution in which an electrolyte salt is dissolved in a solvent is impregnated in the separator. The electrolytic solution contains a cyclic ester carbonate derivative having halogen atom such as 4-fluoro-1,3-dioxolan-2-one and a light metal salt such as difluoro[oxolate-O,O'] lithium borate, tetrafluoro[oxolate-O,O']lithium phosphate, and difluoro bis[oxolate-O,O']lithium phosphate.

14 Claims, 5 Drawing Sheets

BATTERY

CROSS REFERENCES TO RELATED APPLICATIONS

The present application claims priority to Japanese Patent Application JP 2004-357815 filed in the Japanese Patent Office on Dec. 10, 2004, and Japanese Patent Application JP 2005-141552 filed in the Japanese Patent Office on May 13, 2005, the entire contents of which being incorporated herein by reference.

BACKGROUND

The present invention relates to a battery including a cathode, an anode, and an electrolyte, particularly to a battery including a cathode, an anode, and an electrolyte and using lithium (Li) or the like as an electrolytic reactant.

In recent years, downsizing and weight saving of portable electronic devices represented by a mobile phone, PDA (Personal Digital Assistant), and a notebook personal computer have been actively promoted. As a part thereof, improving the energy density of the battery, the driving power source for such electronic devices, in particular of the secondary battery has been strongly desired. As a secondary battery capable of providing a high energy density, the lithium ion secondary battery using a material capable of inserting and extracting lithium such as carbon materials for the anode is commercialized, and the market thereof is expanded.

Further, as a secondary battery capable of providing a high energy density, there is the lithium metal secondary battery using a lithium metal for the anode and utilizing only precipitation and dissolution reaction of the lithium metal for anode reaction. In the lithium metal secondary battery, the theoretical electrochemical equivalent of the lithium metal is large, 2054 mAh/cm$^3$, which corresponds to 2.5 times of graphite used in the lithium ion secondary battery. Therefore, the lithium metal secondary battery is expected to be the battery capable of providing an energy density higher than of the lithium ion secondary battery. Up to this day, many researchers have made research and development on practical application of the lithium metal secondary battery (for example, refer to "Lithium Batteries," edited by Jean-Paul Gabano, London, N.Y., Academic Press, 1983).

Further, recently, a secondary battery in which the anode capacity includes a capacity component due to insertion and extraction of lithium and a capacity component due to precipitation and dissolution of lithium, and is expressed by the sum thereof has been developed (for example, refer to International Publication No. 01/22519). In the secondary battery, a carbon material capable of inserting and extracting lithium is used for the anode, and lithium is precipitated on the surface of the carbon material in the middle of charge. According to the secondary battery, it is expected to attain a high energy density as in the lithium metal secondary battery.

In the foregoing lithium secondary batteries, traditionally, it has been considered to use a mixture of two or more solvents or to use a halogenated compound or the like for the electrolyte in order to improve battery characteristics such as cycle characteristics (for example, refer to Japanese Unexamined Patent Application Publication Nos. S62-290071 and S62-217567).

However, with the foregoing means, the effects are not exactly sufficient. In particular, in the lithium metal secondary battery, in the secondary battery in which the anode capacity includes a capacity component due to insertion and extraction of lithium and a capacity component due to precipitation and dissolution of lithium, and is expressed by the sum thereof, or in the lithium ion secondary battery in which the anode contains an anode material capable of inserting and extracting an electrode reactant and containing at least one of metal elements and metalloid elements as an element, sufficient cycle characteristics have not been obtained.

SUMMARY

In view of the foregoing, in the present invention, it is desirable to provide a battery capable of improving cycle characteristics.

According to an embodiment of the present invention, there is provided a first battery including a cathode, an anode, and an electrolyte, in which a lithium metal is used as an anode active material, and the electrolyte contains a cyclic ester carbonate derivative having halogen atom and at least one from the group consisting of light metal salts expressed in Chemical formula 1 or Chemical formula 2.

[Chemical formula 1]

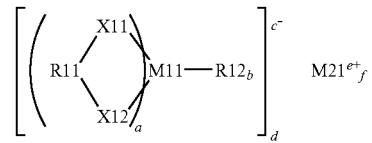

In the formula, R11 represents —C(=O)—R21—C(=O)-group (R21 represents an alkylene group, an alkylene halide group, an arylene group, or an arylene halide group.), —C(=O)—C(R23)(R24)-group (R23 and R24 represent an alkyl group, an alkyl halide group, an aryl group, or an aryl halide group.), or —C(=O)—C(=O)-group. R12 represents a halogen group, an alkyl group, an alkyl halide group, an aryl group, or an aryl halide group. X11 and X12 represent oxygen (O) or sulfur (S), respectively. M11 represents a transition metal element, or a 3B Group element, a 4B Group element, or a 5B Group element in the short period periodic table. M21 represents a 1A Group element or a 2A Group element in the short period periodic table or aluminum (Al). a represents an integer number from 1 to 4. b represents an integer number from 0 to 8. c, d, e, and f represent an integer number from 1 to 3, respectively.

[Chemical formula 2]

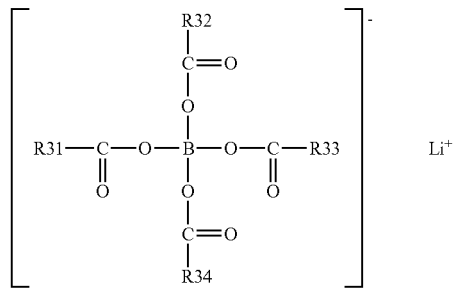

In the formula, R31, R32, R33, and R34 represent a group obtained by substituting at least part of hydrogen of an alkyl group with halogen.

According to an embodiment of the present invention, there is provided a second battery including a cathode, an anode, and an electrolyte, in which an anode contains an anode material capable of inserting and extracting an electrode reactant and containing at least one of metal elements and metalloid elements as an element, and the electrolyte contains a cyclic ester carbonate derivative having halogen atom and at least one from the group consisting of light metal salts expressed in Chemical formula 1 or Chemical formula 2.

[Chemical formula 1]

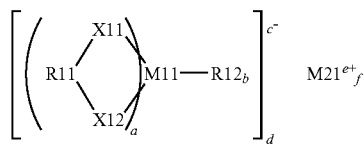

In the formula, R11 represents —C(=O)—R21—C(=O)-group (R21 represents an alkylene group, an alkylene halide group, an arylene group, or an arylene halide group.), —C(=O)—C(R23)(R24)-group (R23 and R24 represent an alkyl group, an alkyl halide group, an aryl group, or an aryl halide group.), or —C(=O)—C(=O)-group. R12 represents a halogen group, an alkyl group, an alkyl halide group, an aryl group, or an aryl halide group. X11 and X12 represent oxygen or sulfur, respectively. M11 represents a transition metal element, or a 3B Group element, a 4B Group element, or a 5B Group element in the short period periodic table. M21 represents a 1A Group element or a 2A Group element in the short period periodic table or aluminum. a represents an integer number from 1 to 4. b represents an integer number from 0 to 8. c, d, e, and f represent an integer number from 1 to 3, respectively.

[Chemical formula 2]

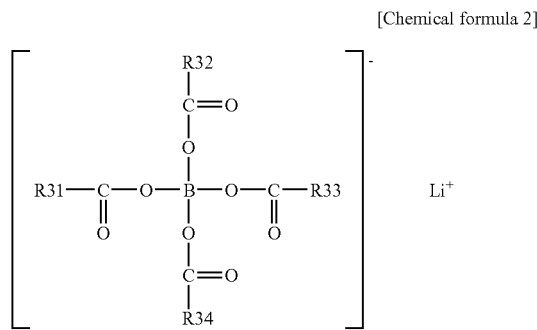

In the formula, R31, R32, R33, and R34 represent a group obtained by substituting at least part of hydrogen of an alkyl group with halogen.

According to an embodiment of the present invention, there is provided a third battery including a cathode, an anode, and an electrolyte, in which a capacity of the anode includes a capacity component due to insertion and extraction of a light metal and a capacity component due to precipitation and dissolution of the light metal, and is expressed by the sum thereof, and the electrolyte contains a cyclic ester carbonate derivative having halogen atom and at least one from the group consisting of light metal salts expressed in Chemical formula 1 or Chemical formula 2.

[Chemical formula 1]

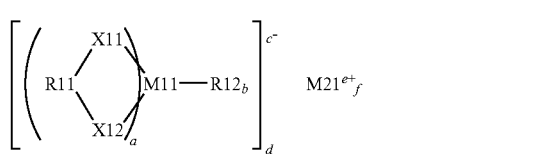

In the formula, R11 represents —C(=O)—R21—C(=O)-group (R21 represents an alkylene group, an alkylene halide group, an arylene group, or an arylene halide group.), —C(=O)—C(R23)(R24)-group (R23 and R24 represent an alkyl group, an alkyl halide group, an aryl group, or an aryl halide group.), or —C(=O)—C(=O)-group. R12 represents a halogen group, an alkyl group, an alkyl halide group, an aryl group, or an aryl halide group. X11 and X12 represent oxygen or sulfur, respectively. M11 represents a transition metal element, or a 3B Group element, a 4B Group element, or a 5B Group element in the short period periodic table. M21 represents a 1A Group element or a 2A Group element in the short period periodic table or aluminum. a represents an integer number from 1 to 4. b represents an integer number from 0 to 8. c, d, e, and f represent an integer number from 1 to 3, respectively.

[Chemical formula 2]

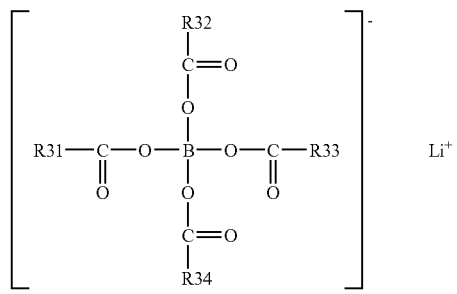

In the formula, R31, R32, R33, and R34 represent a group obtained by substituting at least part of hydrogen of an alkyl group with halogen.

According to the first to the third batteries of the embodiments of the present invention, in the electrolyte, the cyclic ester carbonate derivative having halogen atom and the light metal salt expressed in Chemical formula 1 or Chemical formula 2 are contained. Therefore, decomposition reaction of the solvent in the anode can be inhibited. Consequently, charge and discharge efficiency in the anode can be improved, and cycle characteristics can be improved.

Further, when other light metal salt is used in addition to the light metal salt expressed in Chemical formula 1 or Chemical formula 2, cycle characteristics can be more improved.

Other and further objects, features and advantages of the invention will appear more fully from the following description.

Additional features and advantages are described herein, and will be apparent from, the following Detailed Description and the figures.

DETAILED DESCRIPTION

Embodiments of the present invention will be hereinafter described in detail with reference to the drawings.

First Embodiment

Figure 1:
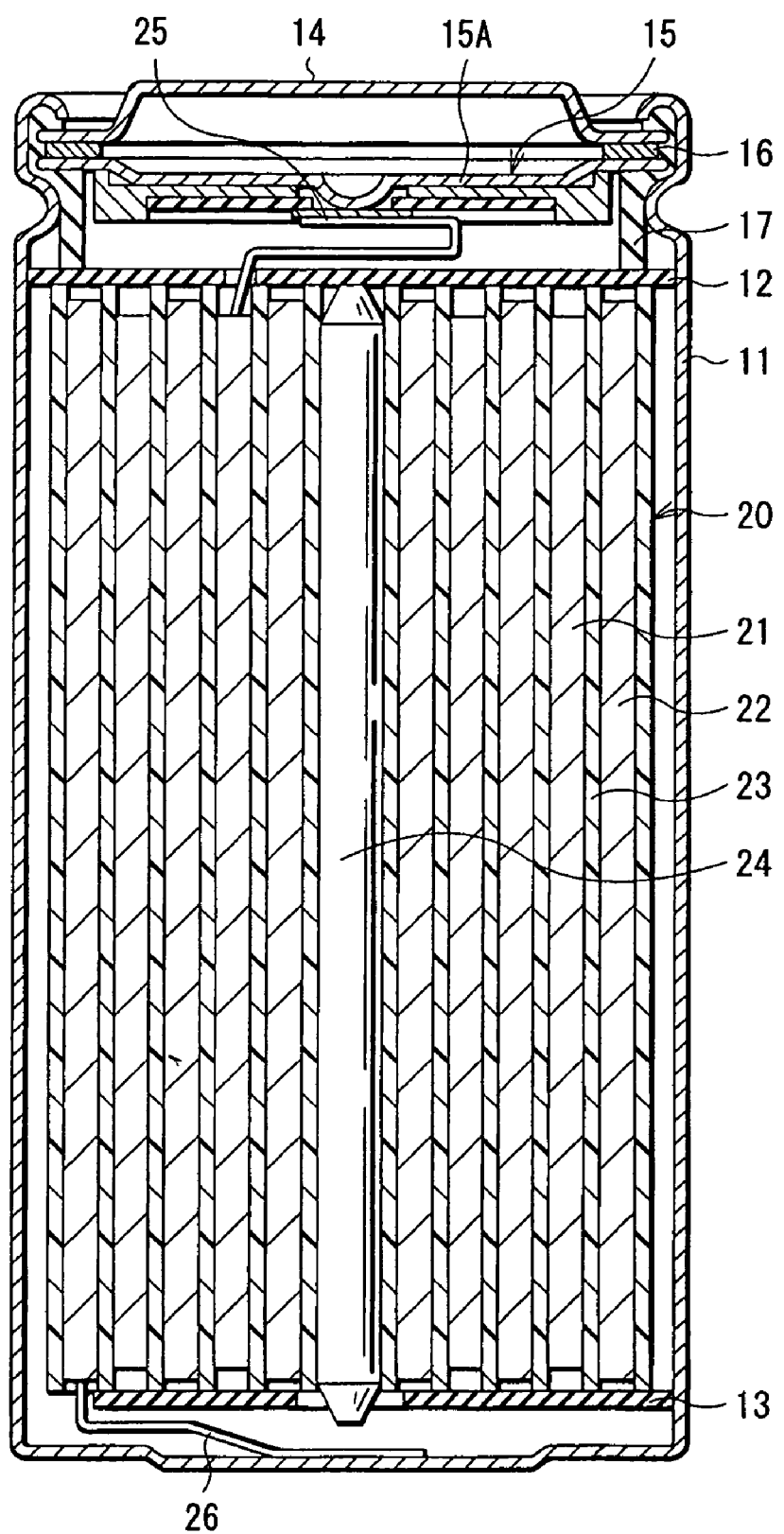
FIG. 1 is a cross section showing a structure of a secondary battery according to an embodiment of the present invention.

FIG. 1 shows a cross sectional structure of a secondary battery according to a first embodiment. The secondary battery is a lithium metal secondary battery in which the anode capacity is expressed by the capacity component due to precipitation and dissolution of lithium as the electrode reactant. The secondary battery is a so-called cylinder-type battery, and has a spirally wound electrode body 20 in which a strip-shaped cathode 21 and a strip-shaped anode 22 are wound with a separator 23 in between inside a battery can 11 in the shape of approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

For example, the spirally wound electrode body 20 is wound centering on a center pin 24. A cathode lead 25 made of aluminum or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
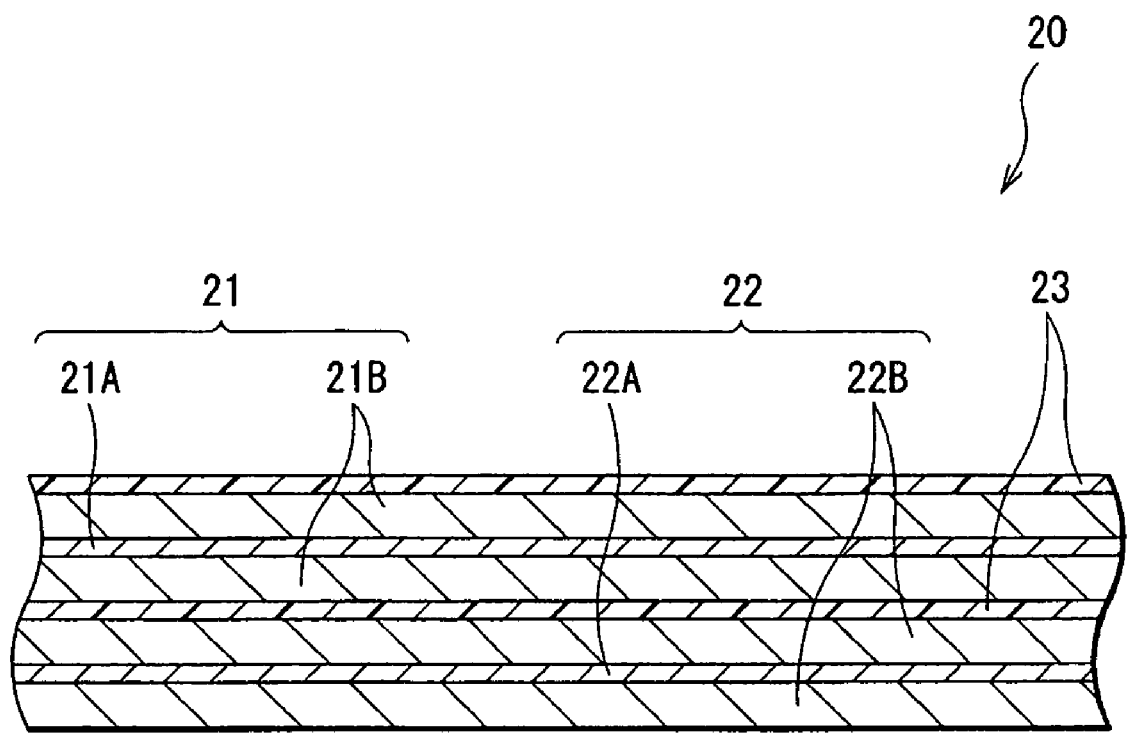
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. Though not shown, the cathode active material layer 21B may be provided on only the single face of the cathode current collector 21A. The cathode current collector 21A is, for example, about from 5 μm to 50 μm thick, and is made of a metal foil such as an aluminum foil, a nickel foil, and a stainless foil. The cathode active material layer 21B contains, for example, as a cathode active material, one or more cathode active materials capable of inserting and extracting lithium as the electrode reactant. If necessary, the cathode active material layer 21B contains an electrical conductor and a binder. The thickness of the cathode active material layer 21B is, for example, from 60 μm to 250 μm. When the cathode active material layer 21B is provided on the both faces of the cathode current collector 21A, the thickness of the cathode active material layer 21B is the total of the cathode active material layer 21B provided on the both faces of the cathode current collector 21A.

As a cathode material capable of inserting and extracting lithium, for example, a lithium-containing compound containing lithium, transition metals, and oxygen is preferable in order to improve an energy density. Specially, the lithium-containing compound containing at least one from the group consisting of cobalt (Co), nickel, manganese (Mn), and iron as a transition metal element is more preferable. As such a lithium-containing compound, for example, $LiCoO_2$, $LiNi_{1-x}Co_xO_2$, (0<x<1), $LiMn_2O_4$, or $LiFePO_4$ can be cited.

Such a cathode material is prepared by, for example, mixing a carbonate, a nitrate, an oxide, or a hydroxide of lithium and a carbonate, a nitrate, an oxide, or a hydroxide of a transition metal at a desired composition, pulverizing the mixture, and then firing the resultant at temperatures in the range from 600 deg C. to 1000 deg C. in the oxygen atmosphere.

As an electrical conductor, for example, carbon materials such as graphite, carbon black, and Ketjen black can be cited. One thereof is used singly, or two or more thereof are used by mixing. Further, in addition to the carbon material, a metal material, a conductive high molecular weight compound material or the like may be used, as long as the material has conductivity. As a binder, for example, a synthetic rubber such as styrene butadiene rubber, fluorinated rubber, and ethylene propylene diene rubber, or a high molecular weight material such as polyvinylidene fluoride can be cited. One thereof is used singly, or two or more thereof are used by mixing. For example, when the cathode 21 and the anode 22 are wound as shown in FIG. 1, styrene butadiene rubber, fluorinated rubber or the like having flexibility is preferably used as a binder.

An anode 22 has a structure in which an anode active material layer 22B is provided on the both faces of an anode current collector 22A having a pair of opposed faces. Though not shown, the anode active material layer 22B may be provided only on the single face of the anode current collector 22A. The anode current collector 22A is made of, for example, a metal foil such as a copper foil, a nickel foil, and a stainless foil having favorable electrochemical stability, electrical conductivity, and mechanical strength. In particular, the copper foil is most preferable since the copper foil has a high electric conductivity. The thickness of the anode current collector 22A is preferably, for example, about 5 μm to 40

μm. When the thickness thereof is thinner than 5 μm, mechanical strength is lowered, the anode current collector 22A is easily broken in the manufacturing steps, and production efficiency is lowered. When the thickness thereof is thicker than 40 μm, the volume ratio of the anode current collector 22A in the battery becomes large more than necessary, and it becomes difficult to improve an energy density.

The anode active material layer 22B is formed, for example, from a lithium metal as the anode active material, and thereby a high energy density can be obtained. The anode active material layer 22B may already exist in assembly, or it is possible that the anode active material layer 22B does not exist in assembly, but is composed of the lithium metal precipitated in charging. Further, the anode active material layer 22B may be utilized as a current collector as well and the anode current collector 22A may be omitted then.

A separator 23 is made of, for example, a synthetic resin porous film made of polytetrafluoroethylene, polypropylene, polyethylene or the like, or a ceramics porous film. The separator 23 may have a structure in which two or more of the foregoing porous films are layered. Specially, the porous film made of polyolefin is preferable since the porous film made of polyolefin has a superior short circuit prevention effect and provides improved safety of the battery by shutdown effect. In particular, as a material composing the separator 23, polyethylene is preferable, since polyethylene provides shutdown effects in the range from 100 deg C. to 160 deg C. and has superior electrochemical stability. Further, polypropylene is also preferable. In addition, as long as a resin has chemical stability, such a resin may be used by being copolymerized with polyethylene or polypropylene, or by being blended with polyethylene or polypropylene.

An electrolytic solution, which is the liquid electrolyte, is impregnated in the separator 23. The electrolytic solution contains, for example, a solvent and an electrolyte salt dissolved in the solvent.

The solvent preferably contains a cyclic ester carbonate derivative having halogen atom. Specially, the solvent desirably contains a cyclic ester carbonate derivative expressed in Chemical formula 3. Thereby, decomposition reaction of the solvent in the anode 22 can be inhibited. The solvent may be used singly, or two or more solvents may be used by mixing.

[Chemical formula 3]

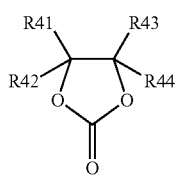

In the formula, R41, R42, R43, and R44 represent a hydrogen group, a fluorine group, a chlorine group, a bromine group, a methyl group, an ethyl group or a group obtained by substituting part of hydrogen of a methyl group or an ethyl group with a fluorine group, a chlorine group, or a bromine group. At least one thereof is a group having halogen. R41, R42, R43, and R44 may be identical or different.

Specific examples of the cyclic ester carbonate derivative expressed in Chemical formula 3 include compounds expressed in (1-1) to (1-14) of Chemical formula 4 and compounds expressed in (1-15) to (1-22) of Chemical formula 5 and the like.

[Chemical formula 4]

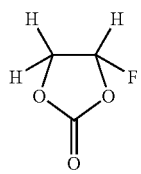

(1-1)

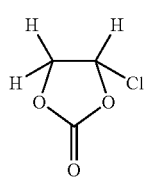

(1-2)

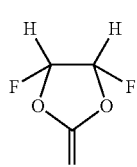

(1-3)

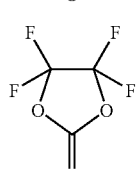

(1-4)

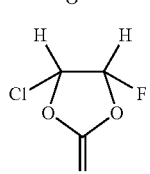

(1-5)

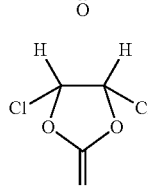

(1-6)

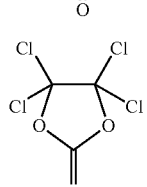

(1-7)

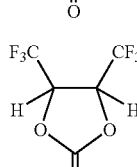

(1-8)

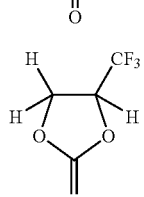

(1-9)

-continued (1-10) 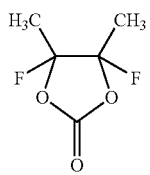

(1-11) 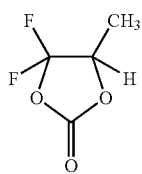

(1-12) 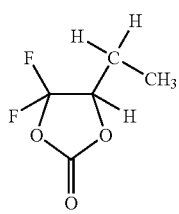

(1-13) 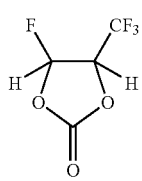

(1-14) 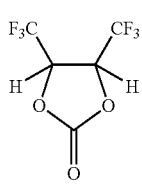

[Chemical formula 5]

(1-15) 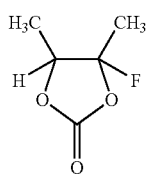

(1-16) 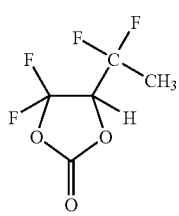

(1-17) 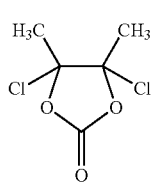

(1-18) 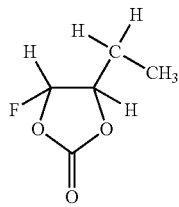

(1-19) 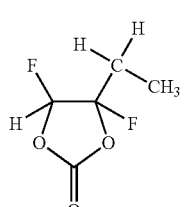

(1-20) 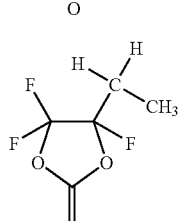

(1-21) 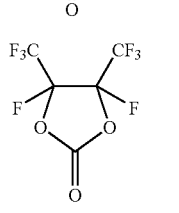

(1-22) 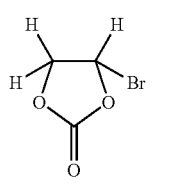

Further, the cyclic ester carbonate derivative having halogen atom may be used by being mixed with various solvents traditionally used. Specific examples of such a solvent include ethylene carbonate, propylene carbonate, butylene carbonate, vinylene carbonate, γ-butyrolactone, γ-velerolactone, 1,2-dimethoxy ethane, tetrahydrofuran, 2-methyl tetrahydrofuran, 1,3-dioxolan, 4-methyl-1,3-dioxolan, methyl acetate, methyl propionate, ethyl propionate, dimethyl carbonate, ethyl methyl carbonate, diethyl carbonate, acetonitrile, glutaronitrile, adiponitrile, methoxy acetonitrile, 3-methoxy propylonitrile, N,N-dimethylformamide, N-methyl pyrolizinone, N-methyl oxazolizinone, N,N'-dimethyl imidazolizinone, nitromethane, nitroethane, sulfolane, dimethyl sulfoxide, and trimethyl phosphate. Specially, in order to realize superior charge and discharge capacity characteristics and charge and discharge cycle characteristics, at least one from the group consisting of ethylene carbonate, propylene carbonate, vinylene carbonate, dimethyl carbonate, and ethyl methyl carbonate is preferably used. These solvents may be used singly, or several kinds thereof may be used by mixing.

As an electrolyte salt, a light metal salt expressed in Chemical formula 1 is preferably contained. The light metal salt can form a stable coating on the surface of the anode 22, and inhibit decomposition reaction of the solvent. The light metal salt expressed in Chemical formula 1 may be used singly, or several kinds thereof may be used by mixing.

[Chemical formula 1]

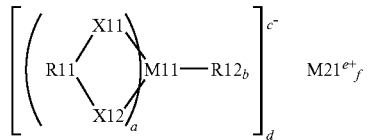

In the formula, R11 represents a group expressed in Chemical formula 6, Chemical formula 7, or Chemical formula 8. R12 represents a halogen group, an alkyl group, an alkyl halide group, an aryl group, or an aryl halide group. X11 and X12 represent oxygen or sulfur, respectively. M11 represents a transition metal element, or a 3B Group element, a 4B Group element, or a 5B Group element in the short period periodic table. M21 represents a 1A Group element or a 2A Group element in the short period periodic table or aluminum. a represents an integer number from 1 to 4. b represents an integer number from 0 to 8. c, d, e, and f represent an integer number from 1 to 3, respectively.

[Chemical formula 6]

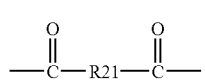

In the formula, R21 represents an alkylene group, an alkylene halide group, an arylene group, or an arylene halide group.

[Chemical formula 7]

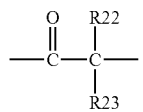

In the formula, R22 and R23 represent an alkyl group, an alkyl halide group, an aryl group, or an aryl halide group. R22 and R23 may be identical or different.

[Chemical formula 8]

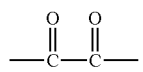

As a light metal salt expressed in Chemical formula 1, for example, a compound expressed in Chemical formula 9 is preferable.

[Chemical formula 9]

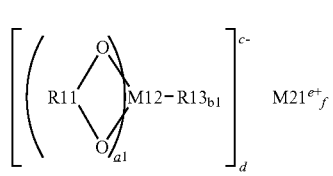

In the formula, R11 represents a group expressed in Chemical formula 6, Chemical formula 7, or Chemical formula 8. R13 represents a halogen group. M12 represents phosphorus (P) or boron (B). M21 represents a 1A Group element or a 2A Group element in the short period periodic table or aluminum. a1 represents an integer number from 1 to 3. b1 represents 0, 2, or 4. c, d, e, and f represent an integer number from 1 to 3, respectively.

Specifically, difluoro[oxolate-O,O']lithium borate expressed in Chemical formula 10, tetrafluoro[oxolate-O,O'] lithium phosphate expressed in Chemical formula 11, difluoro bis[oxolate-O,O']lithium phosphate expressed in Chemical formula 12, difluoro[3,3,3-trifluoro-2-oxide-2-trifluoromethyl propionate(2-)-O,O']lithium borate expressed in Chemical formula 13, or bis[3,3,3-trifluoro-2-oxide-2-trifluoromethyl propionate(2-)-O,O']lithium borate expressed in Chemical formula 14 can be more preferably cited. When B—O bond or P—O bond is included, higher effects can be obtained. In particular, when O—B—O bond or O—P—O bond is included, still higher effects can be obtained. Further, when a light metal salt having a structure expressed in Chemical formula 7 such as difluoro[3,3,3-trifluoro-2-oxide-2-trifluoromethyl propionate(2-)-O,O']lithium borate expressed in Chemical formula 13 and bis[3,3,3-trifluoro-2-oxide-2-trifluoromethyl propionate(2-)-O,O']lithium borate expressed in Chemical formula 14 is used, a cyclic ester carbonate derivative having fluorine is preferably used for the solvent. Furthermore, when difluoro[oxolate-O,O']lithium borate expressed in Chemical formula 10 or difluoro[3,3,3-trifluoro-2-oxide-2-trifluoromethyl propionate(2-)-O,O']lithium borate expressed in Chemical formula 13 is used, a cyclic ester carbonate derivative having chlorine is preferably used for the solvent. Thereby, higher effects can be obtained.

[Chemical formula 10]

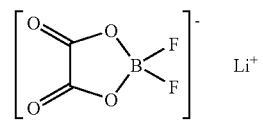

[Chemical formula 11]

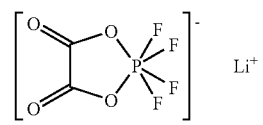

[Chemical formula 12]

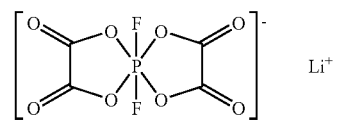

[Chemical formula 13]

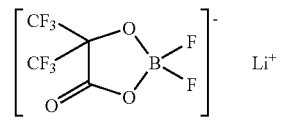

[Chemical formula 14]

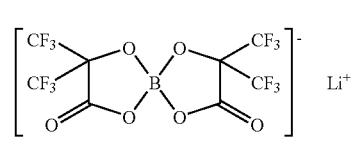

As an electrolyte salt, a light metal salt expressed in Chemical formula 2 is also preferably cited. Such a light metal salt can also form a stable coating on the surface of the anode 22, and can inhibit decomposition reaction of the solvent. The light metal salt expressed in Chemical formula 2 may be used singly, or several kinds thereof may be used by mixing. Further, the light metal salt expressed in Chemical formula 2 may be used by being mixed with the light metal salt expressed in Chemical formula 1.

[Chemical formula 2]

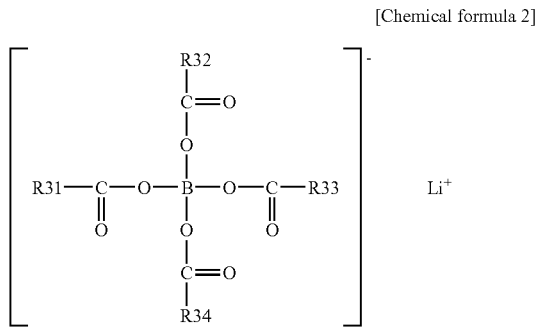

In the formula, R31, R32, R33, and R34 represent a group obtained by substituting at least part of hydrogen of an alkyl group with halogen. R31, R32, R33, and R34 may be identical or different.

Specifically, tetrakis(trifluoro acetate)lithium borate expressed in Chemical formula 15, tetrakis(pentafluoro propanoate)lithium borate expressed in Chemical formula 16, or tetrakis(trichloro acetate)lithium borate expressed in Chemical formula 17 is preferably cited. When B—O bond or P—O bond is included, higher effects can be obtained. In particular, when O—B—O bond or O—P—O bond is included, still higher effects can be obtained. Further, these light metal salts are preferably used by being mixed with a cyclic ester carbonate derivative having fluorine. Furthermore, when tetrakis (trifluoro acetate)lithium borate expressed in Chemical formula 15 is used, a cyclic ester carbonate derivative having chlorine is preferably used for the solvent, since thereby higher effects can be obtained.

$LiB(OCOCF_3)_4$ [Chemical formula 15]

$LiB(OCOC_2F_5)_4$ [Chemical formula 16]

$LiB(OCOCCl_3)_4$ [Chemical formula 17]

Further, for the electrolyte salt, in addition to these light metal salts, one or more other light metal salts are preferably mixed therewith. Thereby, battery characteristics such as storage characteristics can be improved, and internal resistance can be decreased. As other light metal salt, for example, a lithium salt expressed in Chemical formula 18 such as $LiB(C_6H_5)_4$, $LiCH_3SO_3$, $LiCF_3SO_3$, $LiAlCl_4$, $LiSiF_6$, LiCl, LiBr, $LiPF_6$, $LiBF_4$, $LiClO_4$, $LiAsF_6$, $LiN(CF_3SO_2)_2$, $LiN(C_2F_5SO_2)_2$, and $LiN(C_4F_9SO_2)(CF_3SO_2)$, or a lithium salt expressed in Chemical formula 19 such as $LiC(CF_3SO_2)_3$ can be cited.

$LiN(C_mF_{2m+1}SO_2)(C_nF_{2n+1}SO_2)$ [Chemical formula 18]

In the formula, m and n are an integer number of 1 or more.

$LiC(C_pF_{2p+1}SO_2)(C_qF_{2q+1}SO_2)(C_rF_{2r+1}SO_2)$ [Chemical formula 19]

In the formula, p, q, and r are an integer number of 1 or more.

Specially, at least one from the group consisting of $LiPF_6$, $LiBF_4$, $LiClO_4$, $LiAsF_6$, lithium salts expressed in Chemical formula 18, and lithium salts expressed in Chemical formula 19 is preferably contained, since thereby higher effects can be obtained and a higher conductivity can be obtained. It is more preferable that $LiPF_6$ and at least one from the group consisting of $LiBF_4$, $LiClO_4$, $LiAsF_6$, lithium salts expressed in Chemical formula 18, and lithium salts expressed in Chemical formula 19 are used by mixing.

The content (concentration) of the electrolyte salt is preferably in the range from 0.3 mol/kg to 3.0 mol/kg to the solvent. If out of the range, sufficient battery characteristics may not be obtained due to significant decrease in ion conductivity. Of the foregoing, the content of the light metal salt expressed in Chemical formula 1 or Chemical formula 2 is preferably in the range from 0.01 mol/kg to 2.0 mol/kg to the solvent. In such a range, higher effects can be obtained.

The secondary battery can be manufactured, for example, as follows.

First, for example, a cathode material capable of inserting and extracting lithium, an electrical conductor, and a binder are mixed to prepare a cathode mixture, which is dispersed in a solvent such as N-methyl-2-pyrrolidone to obtain paste cathode mixture slurry. Next, the cathode current collector 21A is coated with the cathode mixture slurry, which is dried and compression-molded by a rolling press machine or the like to form the cathode active material layer 21B and form the cathode 21.

Further, for example, as the anode 22, the anode current collector 22A is prepared. For the anode 22, a lithium metal may be used as it is, or the anode obtained by forming the anode active material 22B on the anode current collector 22A by attaching a lithium metal may be used.

Subsequently, the cathode lead 25 is attached to the cathode current collector 21A by welding or the like, and the anode lead 26 is attached to the anode current collector 22A by welding or the like. After that, the cathode 21 and the anode 22 are wound with the separator 23 in between. The end of the cathode lead 25 is welded to the safety valve mechanism 15, and the end of the anode lead 26 is welded to the battery can 11. The wound cathode 21 and the wound anode 22 are sandwiched between the pair of insulating plates 12 and 13, and contained inside the battery can 11. After the cathode 21 and the anode 22 are contained inside the battery can 11, the electrolytic solution is injected into the battery can 11 and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

In the secondary battery, when charged, for example, lithium ions are extracted from the cathode 21 and precipitated as a lithium metal on the surface of the anode current collector 22A through the electrolytic solution, and the anode active material layer 22B is formed as shown in FIG. 2. When discharged, for example, the lithium metal is eluted as lithium ions from the anode active material layer 22B, and inserted in the cathode 21 through the electrolytic solution. Here, the electrolytic solution contains the cyclic ester carbonate derivative having halogen atom and the light metal salt expressed in Chemical formula 1 or Chemical formula 2, and therefore decomposition reaction of the solvent in the anode 22 is inhibited. Therefore, charge and discharge efficiency of lithium in the anode 22 is improved.

As above, in this embodiment, since the electrolytic solution contains the cyclic ester carbonate derivative having halogen atom and the light metal salt expressed in Chemical formula 1 or Chemical formula 2, decomposition reaction of the solvent in the anode 22 can be inhibited. Therefore, charge and discharge efficiency in the anode 22 is improved, and cycle characteristics can be improved.

Further, when other light metal salt is used in addition to the light metal salt expressed in Chemical formula 1 or Chemical formula 2, cycle characteristics can be more improved.

Second Embodiment

A secondary battery according to a second embodiment of the present invention is a so-called lithium ion secondary battery, in which the anode capacity is expressed by the capacity component due to insertion and extraction of lithium, which is the electrode reactant.

The secondary battery has a structure and effects similar to of the secondary battery according to the first embodiment except that the anode active material layer has a different structure, and can be similarly manufactured. Therefore, here, descriptions will be given by using the same symbols with reference to FIG. 1 and FIG. 2. Detailed descriptions of the same components will be omitted.

The anode active material layer 22B contains, for example, as an anode active material, an anode material capable of inserting and extracting lithium as the electrode reactant.

In the secondary battery, the charge capacity of the anode material capable of inserting and extracting lithium is larger than the charge capacity of the cathode 21. That is, in the secondary battery, a lithium metal is not precipitated on the anode 22 in the middle of charge.

As an anode material capable of inserting and extracting lithium, for example, a material containing tin or silicon as an element can be cited. Tin and silicon have a high ability to insert and extract lithium, and provide a high energy density.

As such an anode material, a simple substance, an alloy, or a compound of tin; a simple substance, an alloy, or a compound of silicon; or a material having one or more phases thereof at least in part can be cited specifically. In the present invention, alloys include an alloy containing one or more metal elements and one or more metalloid elements in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As an alloy of tin, for example, an alloy containing, as a second element other than tin, at least one from the group consisting of silicon, nickel, copper, iron, cobalt (Co), manganese (Mn), zinc (Zn), indium (In), silver (Ag), titanium (Ti), germanium (Ge), bismuth (Bi), antimony (Sb), and chromium (Cr) can be cited. As an alloy of silicon, for example, an alloy containing, as a second element other than silicon, at least one from the group consisting of tin, nickel, copper, iron, cobalt, manganese, zinc, indium, silver, titanium, germanium, bismuth, antimony, and chromium can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC-containing material containing tin, cobalt, and carbon as an element, in which the carbon content is from 9.9 wt % to 29.7 wt %, and the ratio of cobalt to the total of tin and cobalt (Co/(Sn+Co)) is from 30 wt % to 70 wt % is preferable. In such a composition range, a high energy density can be obtained, and superior cycle characteristics can be obtained.

The CoSnC-containing material may further contain other elements if necessary. As other element, for example, silicon, iron, nickel, chromium, indium, niobium (Nb), germanium, titanium, molybdenum (Mo), aluminum, phosphorus, gallium (Ga), or bismuth is preferable. Two or more thereof may be contained, since a capacity or cycle characteristics can be thereby further improved.

The CoSnC-containing material has a phase containing tin, cobalt, and carbon. The phase preferably has a structure with low crystallinity or an amorphous structure. Further, it is preferable that in the CoSnC-containing material, at least part of carbon as the element is bonded to a metal element or a metalloid element, which is other element. It is thinkable that lowered cycle characteristics are caused by cohesion or crystallization of tin or the like. Such cohesion or crystallization can be inhibited by bonding carbon to other element.

As a measuring method for examining bonding state of elements, for example, X-ray Photoelectron Spectroscopy (XPS) can be cited. In XPS, in the case of graphite, the peak of 1s orbital of carbon (C1s) is observed at 284.5 eV in the apparatus in which energy calibration is made so that the peak of 4f orbital of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element, which is other element.

In XPS measurement, for example, the peak of C1s is used for correcting the energy axis of spectrums. Since surface contamination carbon generally exists on the surface, the peak of C1s of the surface contamination carbon is set to at 284.8 eV, which is used as an energy reference. In XPS measurement, the waveform of the peak of C1s is obtained as a form including the peak of the surface contamination carbon and the peak of carbon in the CoSnC-containing material. Therefore, by analyzing the waveform by using a commercially available software or the like, the peak of the surface contamination carbon and the peak of carbon in the CoSnC-containing material are separated. In the analysis of the waveform, the position of the main peak existing on the lowest bound energy side is set to the energy reference (284.8 eV).

As an anode material capable of inserting and extracting lithium, for example, a material containing other metal elements or other metalloid elements capable of forming an alloy with lithium as an element can be cited. As such a metal element or such a metalloid element, magnesium (Mg), boron, aluminum, gallium, indium, germanium, lead (Pb), bismuth, cadmium (Cd), silver, zinc, hafnium (Hf), zirconium (Zr), yttrium (Y), palladium (Pd), or platinum (Pt) can be cited.

In addition to the foregoing anode material, the anode active material layer 22B may further contain other anode material and other material such as a binder, for example, polyvinylidene fluoride and an electrical conductor. As other anode material, a carbon material capable of inserting and extracting lithium can be cited. The carbon materials are preferable because in the case of using the carbon material, change of crystal structure occurring at charge and discharge is very little, and for example, when the carbon material is used with the foregoing anode material, a higher energy density can be obtained, superior cycle characteristics can be obtained, and function as an electrical conductor can be thereby obtained as well.

As such a carbon material, for example, graphite, non-graphitizable carbon, and graphitizable carbon can be cited.

In particular, graphite is preferable since graphite has a large electrochemical equivalent and provides a high energy density.

As graphite, for example, graphite with a true density of 2.10 g/cm$^3$ or more is preferable, and graphite with a true density of 2.18 g/cm$^3$ or more is more preferable. In order to obtain such a true density, it is necessary that the C axis crystallite thickness on (002) face is 14.0 nm or more. Further the face distance of the (002) face is preferably under 0.340 nm, and more preferably in the range from 0.335 nm to 0.337 nm.

As non-graphitizable carbon, non-graphitizable carbon with a face distance of (002) face of 0.37 nm or more and a true density of under 1.70 g/cm$^3$, which does not show the exothermic peak at 700 deg C. or more in differential thermal analysis (DTA) in the air is preferable.

The anode 22 can be formed as follows. For example, an anode material capable of inserting and extracting lithium, an electrical conductor, and a binder are mixed to prepare an anode mixture, which is dispersed in a solvent such as N-methyl-2-pyrrolidone to obtain paste anode mixture slurry. After that, the anode current collector 22A is coated with the anode mixture slurry, the solvent is dried and compression-molded by a rolling press machine or the like to form the anode active material layer 22B and form the anode 22.

In the secondary battery, when charged, for example, lithium ions are extracted from the cathode 21 and inserted in the anode 22 through the electrolytic solution. When discharged, for example, lithium ions are extracted from the anode 22 and inserted in the cathode 21 through the electrolytic solution. Here, the electrolytic solution contains the cyclic ester carbonate derivative having halogen atom and the light metal salt expressed in Chemical formula 1 or Chemical formula 2, and therefore decomposition reaction of the solvent in the anode 22 is inhibited. Therefore, charge and discharge efficiency of lithium in the anode 22 is improved.

Third Embodiment

A secondary battery according to a third embodiment of the present invention has a structure and operation similar to of the secondary battery according to the second embodiment except that the anode has a different structure, and can be similarly manufactured. Therefore, the corresponding components are affixed with the same symbols with reference to FIG. 1 and FIG. 2, and descriptions of the same components will be omitted.

As in the secondary battery according to the second embodiment, the anode 22 has a structure in which the anode active material layer 22B is provided on the both faces or the single face of the anode current collector 22A. The anode active material layer 22B contains, for example, an anode material containing tin or silicon as an element. Specifically, for example, a simple substance, an alloy, or a compound of tin; or a simple substance, an alloy, or a compound of silicon is contained, or two or more thereof may be contained.

Further, the anode active material layer 22B is formed by, for example, vapor-phase deposition method, liquid-phase deposition method, thermal spraying method, firing method, or two or more of these methods. The anode active material layer 22B and the anode current collector 22A are preferably alloyed at the interface thereof at least in part. Specifically, it is preferable that at the interface, elements of the anode current collector 22A are diffused in the anode active material layer 22B, or elements of the anode active material are diffused in the anode current collector 22A, or the both elements are diffused in each other. Thereby, destruction due to expansion and shrinkage of the anode active material layer 22B due to charge and discharge can be inhibited, and electron conductivity between the anode active material layer 22B and the anode current collector 22A can be improved.

Firing method is a method in which, for example, a particulate anode material, a binder and the like are mixed, the mixture is dispersed in a solvent, an anode current collector is coated with the resultant, which is heat-treated at temperatures higher then the melting point of the binder or the like. As a vapor-phase deposition method, for example, physical deposition method or chemical deposition method can be used. Specifically, vacuum vapor deposition method, sputtering method, ion plating method, laser ablation method, thermal CVD (Chemical Vapor Deposition) method, plasma CVD method and the like are available. As liquid-phase deposition method, a known technique such as electrolytic plating and electroless plating is available.

Fourth Embodiment

A secondary battery according to a fourth embodiment of the present invention is a secondary battery in which the anode capacity includes the capacity component due to insertion and extraction of lithium as the electrode reactant and the capacity component due to precipitation and dissolution of lithium, and is expressed by the sum thereof.

The secondary battery has a structure and effects similar to of the secondary batteries according to the first to the third embodiments, except that the structure of the anode active material layer is different, and can be similarly manufactured. Therefore, here, descriptions will be given by using the same symbols with reference to FIG. 1 and FIG. 2. Detailed descriptions on the same components will be omitted.

In the anode active material layer 22B, for example, by setting the charge capacity of the anode material capable of inserting and extracting lithium smaller than the charge capacity of the cathode 21, a lithium metal begins to be precipitated on the anode 22 when the open circuit voltage (that is, battery voltage) is lower than the overcharge voltage in charging process. Therefore, in the secondary battery, both the anode material capable of inserting and extracting lithium and the lithium metal function as an anode active material, and the anode material capable of inserting and extracting lithium is a base material when the lithium metal is precipitated. As an anode material capable of inserting and extracting lithium, a material similar to in the second embodiment can be cited. Specially, a carbon material capable of inserting and extracting lithium is preferable.

The overcharge voltage means an open circuit voltage when the battery is overcharged. For example, the overcharge voltage means a higher voltage than the open circuit voltage of the battery, which is "fully charged," described in and defined by "Guidelines for Safety Assessment of lithium secondary batteries" (SBA G1101), which is one of guidelines specified by Japan Storage Battery Industries Incorporated (Battery Association of Japan). In other words, the overcharge voltage means a higher voltage than the open circuit voltage after charge by using charging method used in obtaining nominal capacities of each battery, a standard charging method, or a recommended charging method.

Thereby, in the secondary battery, a high energy density can be obtained, and cycle characteristics and rapid charge characteristics can be improved. The secondary battery is similar to the traditional lithium ion secondary battery in view of using the anode material capable of inserting and extracting lithium for the anode 22. Further, the secondary battery is similar to the traditional lithium metal secondary battery in view that the lithium metal is precipitated on the anode 22.

In order to obtain these characteristics more effectively, for example, it is preferable that the maximum precipitation capacity of the lithium metal precipitated on the anode 22 at the maximum voltage before the open circuit voltage becomes the overcharge voltage is from 0.05 times to 3.0 times the charge capacity ability of the anode material capable of inserting and extracting lithium. When precipitation amount of the lithium metal is too large, the disadvantage similar to of the traditional lithium metal secondary battery is caused. Meanwhile, when precipitation amount of the lithium metal is too small, the charge and discharge capacity is not able to be sufficiently large. Further, for example, the discharge capacity ability of the anode material capable of inserting and extracting lithium is preferably from 150 mAh/g or more. The higher the ability capable of inserting and extracting lithium is, the smaller the precipitation amount of the lithium metal becomes relatively. The charge capacity ability of the anode material is obtained from, for example, the electric charge when charge is performed for the anode having the anode active material composed of such an anode material by constant current and constant voltage method up to 0 V by using the lithium metal as a counter electrode. The discharge capacity ability of the anode material is obtained from, for example, the electric charge when discharge is subsequently performed up to 2.5 V for 10 hours or more by constant current method.

In the secondary battery, when charged, lithium ions are extracted from the cathode 21, and firstly inserted in the anode material capable of inserting and extracting lithium contained in the anode 22 through the electrolytic solution. When further charged, in the state that the open circuit voltage is lower than the overcharge voltage, the lithium metal begins to be precipitated on the surface of the anode material capable of inserting and extracting lithium. After that, until charge is finished, the lithium metal continues to be precipitated on the anode 22. Next, when discharged, first, the lithium metal precipitated on the anode 22 is eluted as ions, which are inserted in the cathode 21 through the electrolytic solution. When further discharged, lithium ions inserted in the anode material capable of inserting and extracting lithium in the anode 22 are extracted, and inserted in the cathode 21 through the electrolytic solution. Here, the electrolytic solution contains the cyclic ester carbonate derivative having halogen atom and the light metal salt expressed in Chemical formula 1 or Chemical formula 2, and therefore decomposition reaction of the solvent in the anode 22 can be inhibited. Therefore, charge and discharge efficiency of lithium in the anode 22 is improved.

Fifth Embodiment

Figure 3:
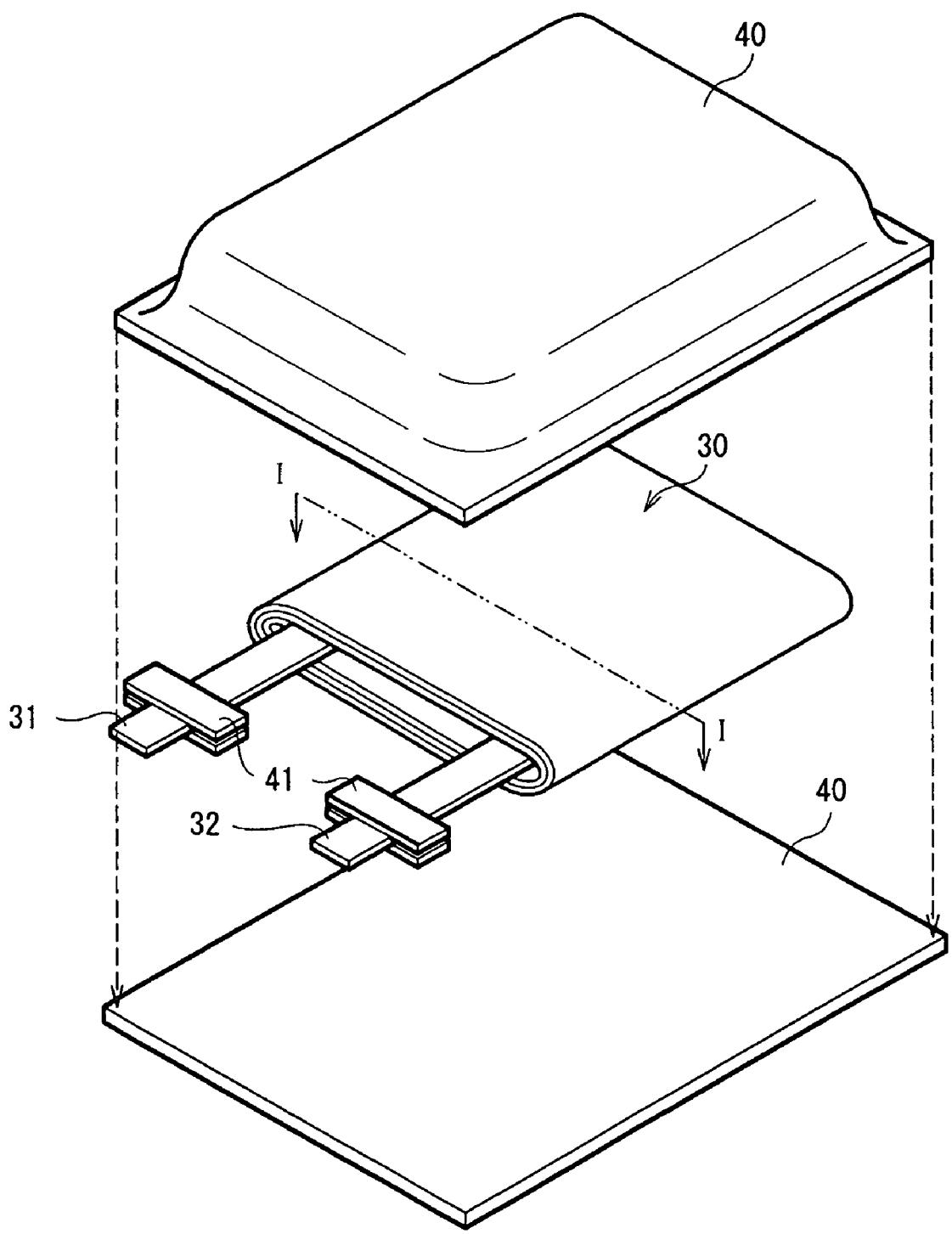
FIG. 3 is an exploded perspective view showing a structure of a secondary battery according to other embodiment of the present invention.

FIG. 3 shows a structure of a secondary battery according to a fifth embodiment. In the secondary battery, a spirally wound electrode body 30 on which a cathode lead 31 and an anode lead 32 are attached is contained inside a film package member 40. Therefore, the size, the weight, and the thickness thereof can be reduced.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless, and are in the shape of thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive. Adhesive films 41 to protect from outside air intrusion are inserted between the package member 40 and the cathode lead 31, the anode lead 32. The adhesive film 41 is made of a material having contact characteristics to the cathode lead 31 and the anode lead 32 such as a polyolefin resin of polyethylene, polypropylene, modified polyethylene, and modified polypropylene.

The package member 40 may be made of a laminated film having other structure, a high molecular weight film such as polypropylene, or a metal film, instead of the foregoing aluminum laminated film.

Figure 4:
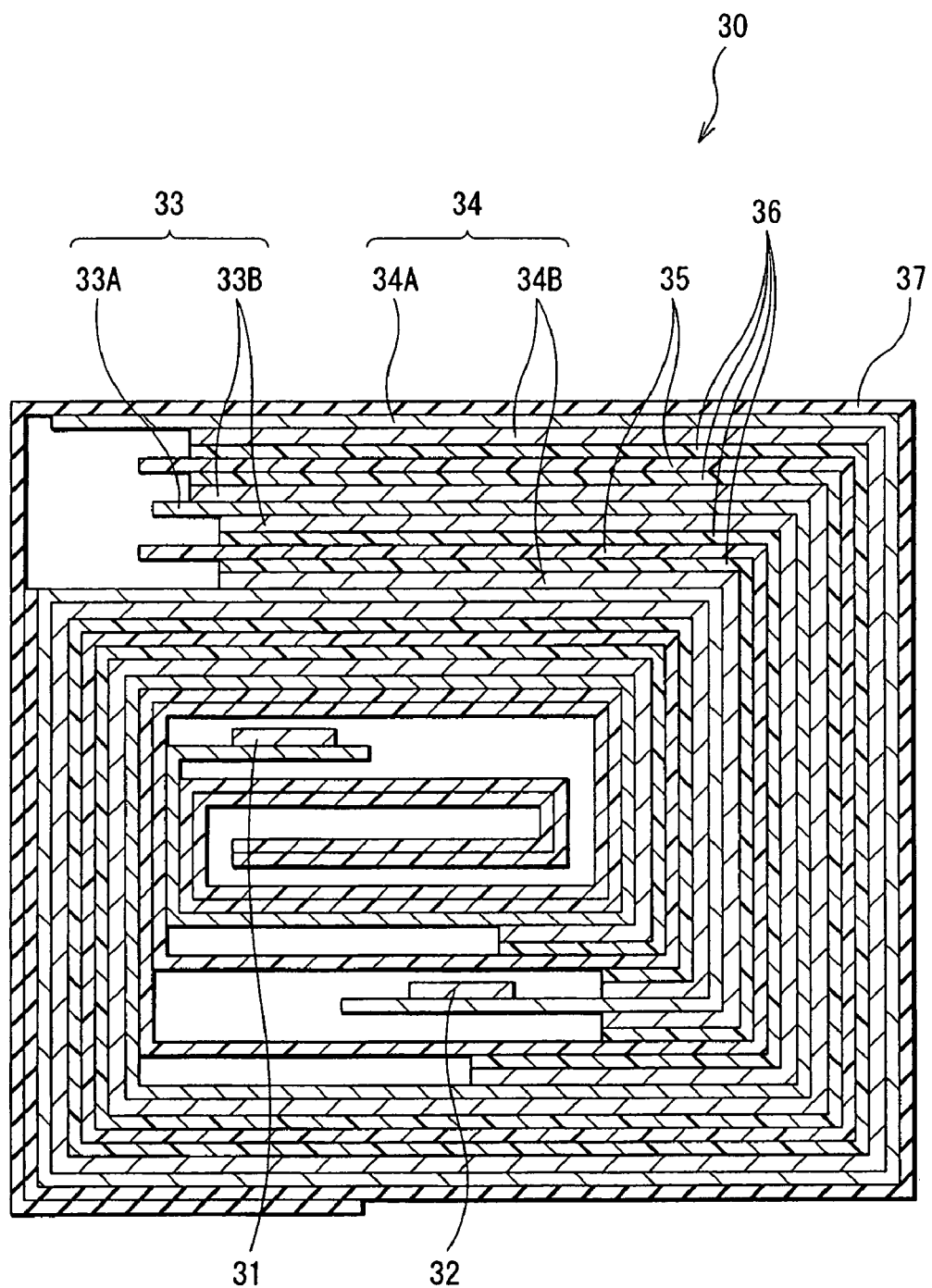
FIG. 4 is a cross section taken along line I-I of a spirally wound electrode body shown in FIG. 3.

FIG. 4 shows a cross sectional structure taken along line I-I of the spirally wound electrode body 30 shown in FIG. 3. In the spirally wound electrode body 30, a cathode 33 and an anode 34 are layered with a separator 35 and an electrolyte layer 36 in between and wound. The outermost periphery thereof is protected by a protective tape 37.

The cathode 33 has a structure in which a cathode active material layer 33B is provided on the single face or the both faces of a cathode current collector 33A. The anode 34 has a structure in which an anode active material layer 34B is provided on the single face or the both faces of an anode current collector 34A. Arrangement is made so that the anode active material layer 34B side is opposed to the cathode active material layer 33B. Structures of the cathode current collector 33A, the cathode active material layer 33B, the anode current collector 34A, the anode active material layer 34B, and the separator 35 are similar to of the cathode current collector 21A, the cathode active material layer 21B, the anode current collector 22A, the anode active material layer 22B, and the separator 23 respectively described in the first to the forth embodiments.

The electrolyte layer 36 is gelatinous, containing an electrolytic solution and a high molecular weight compound to become a holding body, which holds the electrolytic solution. The gelatinous electrolyte layer 36 is preferable, since leak of the battery can be thereby prevented. The structure of the gelatinous electrolyte and the structure of the high molecular weight compound are not particularly limited as long as the gelatinous electrolyte has ion conductivity of 1 mS/cm or more at room temperatures. The structure of the electrolytic solution (that is, a solvent, an electrolyte salt and the like) is similar to of the first to the third embodiments. As a high molecular weight compound, for example, polyacrylonitrile, polyvinylidene fluoride, a copolymer of polyvinylidene fluoride and hexafluoropropylene, polytetrafluoro ethylene, polyhexafluoropropylene, polyethylene oxide, polypropylene oxide, polyphosphazen, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, or polycarbonate can be cited. In particular, in view of electrochemical stability, a high molecular weight compound having a structure of polyacrylonitrile, polyvinylidene fluoride, polyhexafluoropropylene, or polyethylene oxide is desirably used. Though the addition amount of the high molecular weight compound to the electrolytic solution depends on compatibility of the both, the amount of the high molecular weight compound corresponding to 5 wt % to 50 wt % of the electrolytic solution is preferably added in general.

The secondary battery can be manufactured, for example, as follows.

First, the cathode 33 and the anode 34 are respectively coated with a precursor solution containing an electrolytic solution, a high molecular weight compound, and a mixed solvent. The mixed solvent is volatilized to form the electrolyte layer 36. After that, the cathode lead 31 is attached to the end of the cathode current collector 33A by welding, and the anode lead 32 is attached to the end of the anode current collector 34A by welding. Next, the cathode 33 and the anode 34 formed with the electrolyte layer 36 are layered with the separator 35 in between to obtain a lamination. After that, the lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the package members 40 are contacted by thermal fusion-bonding or the like to enclose the spirally wound electrode body 30. Then, the adhesive films 41 are inserted between the cathode lead 31, the anode lead 32 and the package member 40. Thereby, the secondary battery shown in FIG. 3 and FIG. 4 is completed.

Further, the secondary battery may be fabricated as follows. First, the cathode lead 31 and the anode lead 32 are attached on the cathode 33 and the anode 34. After that, the cathode 33 and the anode 34 are layered with the separator 35 in between and wound. The protective tape 37 is adhered to the outermost periphery thereof, and a winding body, which is the precursor of the spirally wound electrode body 30 is formed. Next, the winding body is sandwiched between the package members 40, the outermost peripheries except for one side are thermal fusion-bonded to obtain a pouched state, and the winding body is contained inside the package member 40. Subsequently, a composition of matter for electrolyte containing an electrolytic solution, a monomer as the raw material for the high molecular weight compound, a polymerization initiator, and if necessary other material such as a polymerization inhibitor is prepared, which is injected into the package member 40.

After the composition of matter for electrolyte is injected, the opening of the package member 40 is thermal fusion-bonded and hermetically sealed in the vacuum atmosphere. Next, the resultant is heated to polymerize the monomer to obtain a high molecular weight compound. Thereby, the gelatinous electrolyte layer 36 is formed, and the secondary battery shown in FIG. 3 is completed.

The secondary battery provides operation and effects similar to of the first to the fourth embodiments.

An electrolytic solution as the liquid electrolyte may be used instead of the gelatinous electrolyte. The structure of the electrolytic solution is as described above. The secondary battery can be manufactured, for example, as follows.

First, as described above, after the cathode lead 31 and the anode lead 32 are attached to the cathode 33 and the anode 34, the cathode 33 and the anode 34 are layered with the separator 35 in between and wound. The protective tape 37 is adhered to the outermost periphery to form a winding body, which is the precursor of the spirally wound electrode body 30. Next, the winding body is sandwiched between the package members 40, the outermost peripheries except for one side are thermal fusion-bonded to obtain a pouched state to contain the winding body inside the package member 40. Subsequently, an electrolytic solution is injected into the package member 40. After that, the opening of the package member 40 is hermetically sealed by thermal fusion bonding under the vacuum atmosphere. Thereby, the secondary battery shown in FIG. 3 is completed.

EXAMPLES

Further, specific examples of the present invention will be described in detail.

Examples 1-1 to 1-16

Batteries in which the capacity of the anode 22 was expressed by the capacity component due to precipitation and dissolution of lithium, so-called lithium metal secondary batteries were fabricated. Then, the battery shown in FIG. 1 was used.

First, lithium cobaltate ($Li_2CO_3$) and cobalt carbonate ($CoCO_3$) were mixed at a ratio of $Li_2CO_3:CoCO_3=0.5:1$ (mole ratio). The mixture was fired for 5 hours at 900 deg C. in the air to obtain lithium cobalt complex oxide ($Li_2CoO_2$) as a cathode material. Next, 91 parts by weight of the lithium cobalt complex oxide, 6 parts by weight of graphite as the electrical conductor, and 3 parts by weight of polyvinylidene fluoride as the binder were mixed to prepare a cathode mixture. Subsequently, the cathode mixture was dispersed in N-methyl-2-pyrrolidone as the solvent to obtain cathode mixture slurry. Both faces of the cathode current collector 21A made of a strip-shaped aluminum foil being 20 μm thick were uniformly coated with the cathode mixture slurry, which was dried and compress-molded by a rolling press machine to form the cathode active material layer 21B and form the cathode 21. After that, the cathode lead 25 made of aluminum was attached to one end of the cathode current collector 21A.

Further, the anode active material layer 22B was formed on the anode current collector 22A made of a strip-shaped copper foil being 15 μm thick by attaching a lithium metal to form the anode 22.

After the cathode 21 and the anode 22 were respectively formed, the separator 23 made of a micro porous polypropylene film being 25 μm thick was prepared. Then, the anode 22, the separator 23, the cathode 21, and the separator 23 were layered in this order, and the resultant lamination was spirally wound many times. Thereby, the spirally wound electrode body 20 was formed.

After the spirally wound electrode body 20 was formed, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained inside the battery can 11 made of nickel-plated iron. After that, an electrolytic solution was injected into the battery can 11 by depressurization method.

For the electrolytic solution, an electrolytic solution obtained by dissolving the light metal salt expressed in Chemical formula 1 or Chemical formula 2 as an electrolyte salt in a mixed solvent of cyclic ester carbonate having halogen atom and dimethyl carbonate at a volume ratio of 1:1 so that the light metal salt became 1.0 mol/kg was used. Then, the cyclic ester carbonate having halogen atom was 4-fluoro-1,3-dioxolan-2-one (FEC), 4-chloro-1,3-dioxolan-2-one (CIEC), or 4-bromo-1,3-dioxolan-2-one (BrEC). The electrolyte salt was difluoro[oxolate-O,O']lithium borate expressed in Chemical formula 10, tetrafluoro[oxolate-O,O'] lithium phosphate expressed in Chemical formula 11, difluoro bis[oxolate-O,O']lithium phosphate expressed in Chemical formula 12, difluoro[3,3,3-trifluoro-2-oxide-2-trifluoromethyl propionate(2-)-O,O']lithium borate expressed in Chemical formula 13, or bis[3,3,3-trifluoro-2-oxide-2-trifluoromethyl propionate(2-)-O,O']lithium borate expressed in Chemical formula 14, tetrakis(trifluoro acetate)lithium borate expressed in Chemical formula 15, or tetrakis(pentafluoro propanoate)lithium borate expressed in Chemical formula 16.

After the electrolytic solution was injected into the battery can 11, by caulking the battery can 11 with the battery cover 14 through the gasket 17 with the surface coated with asphalt, cylindrical-type secondary batteries being 14 mm in diameter and 65 mm high were obtained for Examples 1-1 to 1-16.

As Comparative example 1-1 relative to Examples 1-1 to 1-16, a lithium metal secondary battery was fabricated as in Examples 1-1 to 1-16, except that an electrolytic solution obtained by dissolving $LiPF_6$ as an electrolyte salt in a mixed solvent of 4-fluoro-1,3-dioxolan-2-one, which is the cyclic ester carbonate having halogen atom, and dimethyl carbonate at a volume ratio of 1:1 so that $LiPF_6$ became 1.0 mol/kg was used. As Comparative example 1-2, a lithium metal secondary battery was fabricated as in Examples 1-1 to 1-16, except that an electrolytic solution obtained by dissolving difluoro[oxolate-O,O']lithium borate expressed in Chemical formula 10 as an electrolyte salt in a mixed solvent of ethylene carbonate and dimethyl carbonate at a volume ratio of 1:1 so that difluoro[oxolate-O,O']lithium borate became 1.0 mol/kg was used.

Further, as Comparative examples 1-3 to 1-5, secondary batteries were fabricated as in Examples 1-1 to 1-16, except that an electrolytic solution obtained by dissolving difluoro[oxolate-O,O']lithium borate expressed in Chemical formula 10 as an electrolyte salt in a mixed solvent of 4-fluoro-1,3-dioxolan-2-one, which is the cyclic ester carbonate having halogen atom, and diethyl carbonate at a volume ratio of 1:1 so that difluoro[oxolate-O,O']lithium borate became 1.0 mol/kg was used, or an electrolytic solution obtained by dissolving difluoro[oxolate-O,O']lithium borate expressed in Chemical formula 10 as an electrolyte salt in a mixed solvent of ethylene carbonate and dimethyl carbonate at a volume ratio of 1:1 so that difluoro[oxolate-O,O']lithium borate became 1 mol/kg was used, or an electrolytic solution obtained by dissolving $LiPF_6$ as an electrolyte salt in a mixed solvent of 4-fluoro-1,3-dioxolan-2-one, which is the cyclic ester carbonate having halogen atom, and dimethyl carbonate at a volume ratio of 1:1 so that $LiPF_6$ became 1.0 mol/kg was used. Then, for the anode 22, artificial graphite powder was used as an anode material. 90 parts by weight of the artificial graphite powder and 10 parts by weight of polyvinylidene fluoride as the binder were mixed. N-methyl-2-pyrrolidone as the solvent was added to the mixture. The both faces of the anode current collector 22A made of a strip-shaped copper foil being 15 μm thick were uniformly coated with the resultant, which was dried, and compression-molded by a rolling press machine to form the anode active material layer 22B. Consequently, the anode 22 was formed. The area density ratio between the cathode 21 and the anode 22 was designed so that the capacity of the anode 22 was expressed by the capacity component due to insertion and extraction of lithium.

Regarding the obtained secondary batteries of Examples 1-1 to 1-16 and Comparative examples 1-1 to 1-5, cycle characteristics were measured as follows.

First, after constant current charge was performed at a constant current of 100 mA until the battery voltage reached 4.2 V, constant voltage charge was performed at a constant voltage of 4.2 V until the current reached 1 mA. Subsequently, constant current discharge was performed at a constant current of 300 mA until the battery voltage reached 3.0 V. Such charge and discharge were repeated. Cycle characteristics were obtained as the discharge capacity retention ratio at the 100th cycle to the initial discharge capacity (discharge capacity at the first cycle), that is, (discharge capacity at the 100th cycle/initial discharge capacity)×100(%). The obtained results are shown in Table 1.

TABLE 1

| | Anode active material | Solvent | Electrolyte salt | Discharge capacity retention ratio (%) |
|---|---|---|---|---|
| Example 1-1 | Lithium metal | FEC + dimethyl carbonate | Chemical formula 10 | 66 |
| Example 1-2 | | FEC + dimethyl carbonate | Chemical formula 11 | 65 |
| Example 1-3 | | FEC + dimethyl carbonate | Chemical formula 12 | 62 |
| Example 1-4 | | FEC + dimethyl carbonate | Chemical formula 13 | 70 |
| Example 1-5 | | FEC + dimethyl carbonate | Chemical formula 14 | 72 |
| Example 1-6 | | FEC + dimethyl carbonate | Chemical formula 15 | 78 |
| Example 1-7 | | FEC + dimethyl carbonate | Chemical formula 16 | 68 |
| Example 1-8 | | CIEC + dimethyl carbonate | Chemical formula 10 | 80 |
| Example 1-9 | | CIEC + dimethyl carbonate | Chemical formula 11 | 72 |
| Example 1-10 | | CIEC + dimethyl carbonate | Chemical formula 12 | 71 |
| Example 1-11 | | CIEC + dimethyl carbonate | Chemical formula 13 | 76 |
| Example 1-12 | | CIEC + dimethyl carbonate | Chemical formula 14 | 70 |
| Example 1-13 | | CIEC + dimethyl carbonate | Chemical formula 15 | 75 |
| Example 1-14 | | CIEC + dimethyl carbonate | Chemical formula 16 | 68 |
| Example 1-15 | | BrEC + dimethyl carbonate | Chemical formula 10 | 78 |
| Example 1-16 | | BrEC + dimethyl carbonate | Chemical formula 15 | 70 |

TABLE 1-continued

|  | Anode active material | Solvent | Electrolyte salt | Discharge capacity retention ratio (%) |
|---|---|---|---|---|
| Comparative example 1-1 | Lithium metal | FEC + dimethyl carbonate | $LiPF_6$ | 53 |
| Comparative example 1-2 |  | Ethylene carbonate + dimethyl carbonate | Chemical formula 10 | 40 |
| Comparative example 1-3 | Carbon | FEC + dimethyl carbonate | Chemical formula 10 | 91 |
| Comparative example 1-4 |  | Ethylene carbonate + dimethyl carbonate | Chemical formula 10 | 93 |
| Comparative example 1-5 |  | FEC + dimethyl carbonate | $LiPF_6$ | 92 |

FEC: 4-fluoro-1,3-oxolan-2-one
CIEC: 4-chloro-1,3-oxolan-2-one
BrEC: 4-bromo-1,3-oxolan-2-one
Chemical formula 10: difluoro[oxolate-O,O']lithium borate
Chemical formula 11: tetrafluoro[oxolate-O,O']lithium phosphate
Chemical formula 12: difluoro bis[oxolate-O,O']lithium phosphate
Chemical formula 13: difluoro[3,3,3-trifluoro-2-oxide-2-trifluoromethyl propionate(2-)-O,O']lithium borate
Chemical formula 14: bis[3,3,3-trifluoro-2-oxide-2-trifluoromethyl propionate(2-)-O,O']lithium borate
Chemical formula 15: tetrakis(trifluoro acetate)lithium borate
Chemical formula 16: tetrakis(pentafluoro propanoate)lithium As evidenced by Table 1, according to Examples 1-1 to 1-16 using the cyclic ester carbonate having halogen atom and the light metal salt expressed in Chemical formula 1 or Chemical formula 2, the discharge capacity retention ratio was improved more than in Comparative example 1-1 not using the light metal salt expressed in Chemical formula 1 or Chemical formula 2 or Comparative example 1-2 not using the cyclic ester carbonate derivative having halogen atom. Further, according to Comparative examples 1-3 to 1-5 using the artificial graphite for the anode material, the discharge capacity retention ratio was hardly improved even though the cyclic ester carbonate having halogen atom and the light metal salt expressed in Chemical formula 1 or Chemical formula 2 were mixed.

That is, it was found that when the cyclic ester carbonate derivative having halogen atom and the light metal salt expressed in Chemical formula 1 or Chemical formula 2 were used for the lithium metal secondary battery using a lithium metal as an anode active material, cycle characteristics could be improved.

Examples 2-1 to 2-4

Lithium metal secondary batteries were fabricated as in Examples 1-1,1-6, 1-8, and 1-13, except that $LiPF_6$ was further added as an electrolyte salt, the concentration of difluoro[oxolate-O,O']lithium borate expressed in Chemical formula 10 or the concentration of tetrakis(trifluoro acetate)lithium borate expressed in Chemical formula 15 in the electrolytic solution was 0.5 mol/kg, and the concentration of $LiPF_6$ was 0.5 mol/kg. As a cyclic ester carbonate derivative having halogen atom, 4-fluoro-1,3-dioxolan-2-one or 4-chloro-1,3-dioxolan-2-one was used.

Regarding the obtained secondary batteries of Examples 2-1 to 2-4, cycle characteristics were measured as in Examples 1-1 to 1-16. The results are shown in Table 2.

TABLE 2

|  | Anode active material | Solvent | Electrolyte salt Kind | Content (mol/kg) | Discharge capacity retention ratio (%) |
|---|---|---|---|---|---|
| Example 1-1 | Lithium metal | FEC + dimethyl carbonate | Chemical formula 10 | 1.0 | 66 |
| Example 1-6 |  | FEC + dimethyl carbonate | Chemical formula 15 | 1.0 | 78 |
| Example 1-8 |  | CIEC + dimethyl carbonate | Chemical formula 10 | 1.0 | 80 |
| Example 1-13 |  | CIEC + dimethyl carbonate | Chemical formula 15 | 1.0 | 75 |
| Example 2-1 |  | FEC + dimethyl carbonate | Chemical formula 10 $LiPF_6$ | 0.5 0.5 | 70 |
| Example 2-2 |  | FEC + dimethyl carbonate | Chemical formula 15 $LiPF_6$ | 0.5 0.5 | 82 |
| Example 2-3 |  | CIEC + dimethyl carbonate | Chemical formula 10 $LiPF_6$ | 0.5 0.5 | 85 |
| Example 2-4 |  | CIEC + dimethyl carbonate | Chemical formula 15 $LiPF_6$ | 0.5 0.5 | 77 |

FEC: 4-fluoro-1,3-oxolan-2-one
CIEC: 4-chloro-1,3-oxolan-2-one
Chemical formula 10: difluoro[oxolate-O,O']lithium borate
Chemical formula 15: tetrakis(trifluoro acetate)lithium borate As evidenced by Table 2, according to Examples 2-1 to 2-4 further using LiPF$_6$ in addition to difluoro[oxolate-O,O'] lithium borate expressed in Chemical formula 10 or tetrakis (trifluoro acetate)lithium borate expressed in Chemical formula 15, the discharge capacity retention ratio was improved more than in Examples 1-1,1-6, 1-8, and 1-13 not using LiPF$_6$.

That is, it was found that when in addition to the light metal salt expressed in Chemical formula 1 or Chemical formula 2, other light metal salt was mixed therewith, cycle characteristics could be more improved.

Examples 3-1 to 3-5

So-called lithium ion secondary batteries in which the capacity of the anode 22 is expressed by the capacity component due to insertion and extraction of lithium were formed. Then, the secondary batteries were fabricated as in Examples 1-1 to 1-16, except that the anode 22 was formed by forming the anode active material layer 22B made of silicon being 5 μm thick on the anode current collector 22A made of a copper foil being 15 μm thick by vapor deposition. For the electrolytic solution, an electrolytic solution obtained by dissolving tetrakis(trifluoro acetate)lithium borate expressed in Chemical formula 15 as an electrolyte salt in a mixed solvent of 4-fluoro-1,3-dioxolan-2-one, which is the cyclic ester carbonate derivative having halogen atom, and dimethyl carbonate at a volume ratio of 1:1 so that tetrakis(trifluoro acetate) lithium borate became 1.0 mol/kg was used; or an electrolytic solution obtained by dissolving as an electrolyte salt, tetrakis (trifluoro acetate)lithium borate expressed in Chemical formula 15 or difluoro[oxolate-O,O']lithium borate expressed in Chemical formula 10 and LiPF$_6$ in a mixed solvent of 4-fluoro-1,3-dioxolan-2-one, which is the cyclic ester carbonate derivative having halogen atom, and dimethyl carbonate at a volume ratio of 1:1 so that tetrakis(trifluoro acetate) lithium borate or difluoro[oxolate-O,O']lithium borate became 0.5 mol/kg and LiPF$_6$ became 0.5 mol/kg was used; or an electrolytic solution obtained by dissolving as an electrolyte salt, difluoro[oxolate-O,O']lithium borate expressed in Chemical formula 10 or tetrakis(trifluoro acetate)lithium borate expressed in Chemical formula 15 and LiPF$_6$ in a mixed solvent of 4-chloro-1,3-dioxolan-2-one, which is the cyclic ester carbonate derivative having halogen atom, and dimethyl carbonate at a volume ratio of 1:1 so that difluoro [oxolate-O,O']lithium borate or tetrakis(trifluoro acetate)lithium borate became 0.5 mol/kg, and LiPF$_6$ became 0.5 mol/kg was used. The area density ratio between the cathode 21 and the anode 22 was designed so that the capacity of the anode 22 was expressed by the capacity component due to insertion and extraction of lithium.

As Comparative examples 3-1 and 3-2 relative to Examples 3-1 to 3-5, lithium ion secondary batteries were fabricated as in Examples 3-1 to 3-5, except that an electrolytic solution obtained by dissolving LiPF$_6$ as an electrolyte salt in a mixed solvent of 4-fluoro-1,3-dioxolan-2-one, which is the cyclic ester carbonate derivative having halogen atom, and dimethyl carbonate at a volume ratio of 1:1 so that LiPF$_6$ became 1.0 mol/kg was used; or an electrolytic solution obtained by dissolving tetrakis(trifluoro acetate)lithium borate expressed in Chemical formula 15 as an electrolyte salt in a mixed solvent of ethylene carbonate and dimethyl carbonate at a volume ratio of 1:1 so that tetrakis(trifluoro acetate)lithium borate became 1.0 mol/kg was used.

Regarding the obtained lithium ion secondary batteries of Examples 3-1 to 3-5 and Comparative examples 3-1 and 3-2, cycle characteristics were measured as in Examples 1-1 to 1-16. The results are shown in Table 3.

TABLE 3

| | Anode active material | Solvent | Electrolyte salt Kind | Content (mol/kg) | Discharge capacity retention ratio (%) |
|---|---|---|---|---|---|
| Example 3-1 | Si | FEC + dimethyl carbonate | Chemical formula 15 | 1.0 | 77 |
| Example 3-2 | | FEC + dimethyl carbonate | Chemical formula 15 LiPF$_6$ | 0.5 0.5 | 82 |
| Example 3-3 | | FEC + dimethyl carbonate | Chemical formula 10 LiPF$_6$ | 0.5 0.5 | 78 |
| Example 3-4 | | ClEC + dimethyl carbonate | Chemical formula 10 LiPF$_6$ | 0.5 0.5 | 84 |
| Example 3-5 | | ClEC + dimethyl carbonate | Chemical formula 15 LiPF$_6$ | 0.5 0.5 | 75 |
| Comparative example 3-1 | Si | FEC + dimethyl carbonate | LiPF$_6$ | 1.0 | 73 |
| Comparative example 3-2 | | Ethylene carbonate + dimethyl carbonate | Chemical formula 15 | 1.0 | 65 |

FEC: 4-fluoro-1,3-oxolan-2-one
ClEC: 4-chloro-1,3-oxolan-2-one
Chemical formula 10: difluoro[oxolate-O,O']lithium borate
Chemical formula 15: tetrakis(trifluoro acetate)lithium borate As evidenced by Table 3, as in Examples 1-1 to 1-16, according to Examples 3-1 to 3-5 using the cyclic ester carbonate derivative having halogen atom and difluoro[oxolate-O,O']lithium borate expressed in Chemical formula 10 or tetrakis(trifluoro acetate)lithium borate expressed in Chemical formula 15, the discharge capacity retention ratio was improved more than in Comparative example 3-1 not using difluoro[oxolate-O,O']lithium borate expressed in Chemical formula 10 or tetrakis(trifluoro acetate)lithium borate expressed in Chemical formula 15, or Comparative example 3-2 not using the cyclic ester carbonate derivative having halogen atom. Further, as in Examples 2-1 to 2-4, according to Example 3-2 further using LiPF$_6$ in addition to tetrakis (trifluoro acetate)lithium borate expressed in Chemical formula 15, the discharge capacity retention ratio was improved more than in Example 3-1 not using LiPF$_6$.

That is, it was found that in the case of the lithium ion secondary battery containing an anode material capable of inserting and extracting the electrode reactant and containing at least one of metal elements and metalloid elements as an element, cycle characteristics could be improved as long as the cyclic ester carbonate derivative having halogen atom and the light metal salt expressed in Chemical formula 1 or Chemical formula 2 were used, and cycle characteristics could be more improved when other light metal salt was further mixed in addition to the light metal salt expressed in Chemical formula 1 or Chemical formula 2.

Examples 4-1 to 4-16

So-called lithium ion secondary batteries in which the capacity of the anode 22 was expressed by the capacity component due to insertion and extraction of lithium were fabricated as in Examples 3-1 to 3-5, except that a CoSnC-containing material was used as an anode material, the CoSnC-containing material powder, graphite as the electrical conductor, and polyvinylidene fluoride as the binder were dispersed in N-methyl-2-pyrrolidone as the solvent, and then the anode current collector 22A made of a copper foil being 15 μm thick was uniformly coated with the resultant, which was dried to form the anode active material layer 22B and form the anode 22.

In Examples 4-1 to 4-14, for the CoSnC-containing material powder, tin—cobalt-indium-titanium alloy powder and carbon powder were mixed, from which a tin—cobalt-indium-titanium-carbon containing material was synthesized by utilizing mechanochemical reaction. For the obtained CoSnC-containing material, the composition was analyzed. The tin content was 48.0 wt %, the cobalt content was 23.0 wt %, the indium content was 5.0 wt %, the titanium content was 2.0 wt %, the carbon content was 20.0 wt %, and the ratio of cobalt to the total of tin and cobalt (Co/(Sn+Co)) was 32 wt %. The carbon content was measured by a carbon sulfur analyzer. The contents of tin, cobalt, indium, and titanium were measured by ICP (Inductively Coupled Plasma) optical emission spectroscopy. Further, regarding the obtained CoSnC-containing material, X-ray diffraction was performed. In the result, the diffraction peak having a wide half value width with the diffraction angle 2θ of 1.0 degree or more was observed in the range of diffraction angle 2θ=20 to 50 degrees.

Figure 5:
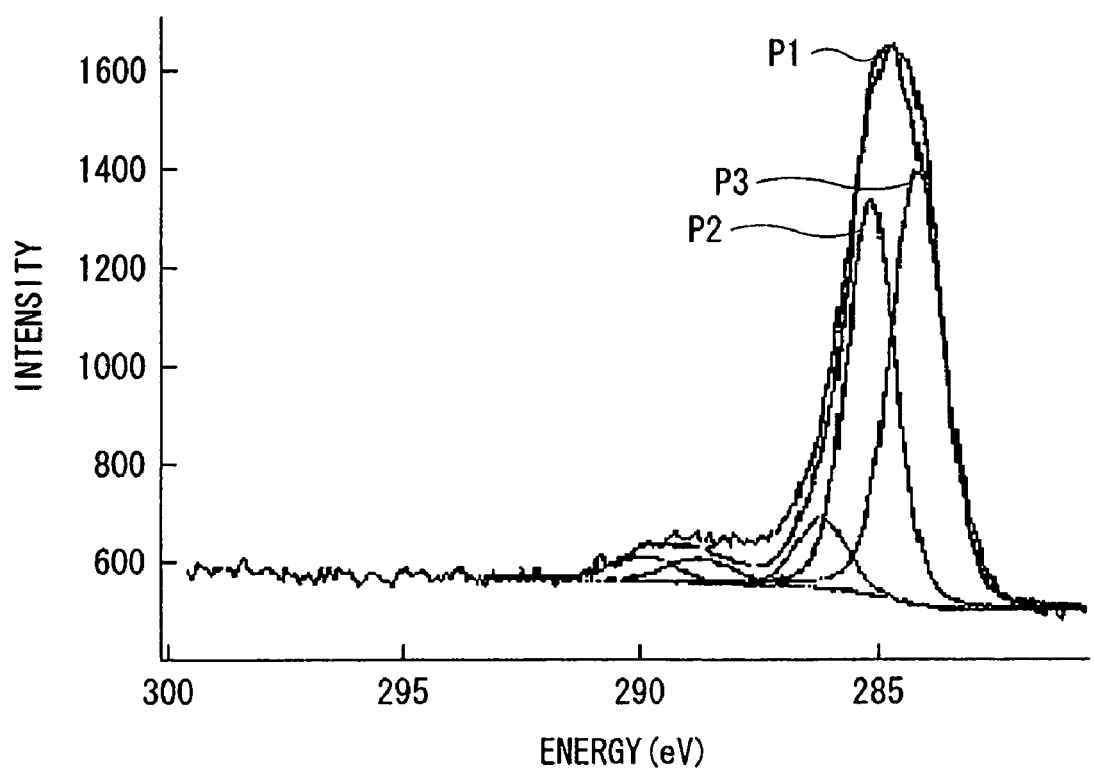
FIG. 5 shows an example of peaks obtained by X-ray photoelectron spectroscopy according to a CoSnC-containing material formed in Examples.

Further, when XPS was performed on the CoSnC-containing material, a peak P1 was obtained as shown in FIG. 5. When the peak P1 was analyzed, a peak P2 of the surface contamination carbon and a peak P3 of C1s in the CoSnC-containing material on the energy side lower than of the peak P2 were obtained. Such peak P3 was obtained in the region lower than 284.5 eV. That is, it was confirmed that carbon in the CoSnC-containing material was bonded to other element.

Further, in Example 4-15, for the CoSnC-containing material powder, tin—cobalt alloy powder, silicon powder, and carbon powder were mixed, from which a tin—cobalt-silicon-carbon containing material was synthesized by utilizing mechanochemical reaction. For the obtained CoSnC-containing material, the composition was similarly analyzed. The tin content was 45.0 wt %, the silicon content was 4.0 wt %, the cobalt content was 29.0 wt %, the carbon content was 20.0 wt %, and the ratio of cobalt to the total of tin and cobalt (Co/(Sn+Co)) was 39 wt %. The silicon content was measured by ICP optical emission spectroscopy. Further, regarding the obtained CoSnC-containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed on the CoSnC-containing material, the peak P1 was obtained as shown in FIG. 5 as in Examples 4-1 to 4-14. When the peak P1 was analyzed, the peak P2 of the surface contamination carbon and the peak P3 of C1s in the CoSnC-containing material on the energy side lower than of the peak P2 were obtained. Such peak P3 was obtained in the region lower than 284.5 eV. That is, it was confirmed that carbon in the CoSnC-containing material was bonded to other element.

Furthermore, in Example 4-16, for the CoSnC-containing material powder, tin—cobalt alloy powder and carbon powder were mixed, from which a CoSnC-containing material was synthesized by utilizing mechanochemical reaction. For the obtained CoSnC-containing material, the composition was analyzed similarly. The tin content was 53.5 wt %, the cobalt content was 25.7 wt %, the carbon content was 19.8 wt %, and the ratio of cobalt to the total of tin and cobalt (Co/(Sn+Co)) was 32 wt %. Further, regarding the obtained CoSnC-containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed on the CoSnC-containing material, the peak P1 was obtained as shown in FIG. 5 as in Examples 4-1 to 4-14. When the peak P1 was analyzed, the peak P2 of the surface contamination carbon and the peak P3 of C1s in the CoSnC-containing material on the energy side lower than of the peak P2 were obtained. Such peak P3 was obtained in the region lower than 284.5 eV. That is, it was confirmed that carbon in the CoSnC-containing material was bonded to other element.

In addition, the electrolytic solution was formed as follows. As an electrolyte salt, difluoro[oxolate-O,O']lithium borate expressed in Chemical formula 10 or tetrakis(trifluoro acetate)lithium borate expressed in Chemical formula 15 and LiPF$_6$, or difluoro[oxolate-O,O']lithium borate expressed in Chemical formula 10 was dissolved in a mixed solvent of 4-fluoro-1,3-dioxolan-2-one, which is the cyclic ester carbonate derivative having halogen atom, ethylene carbonate (EC), dimethyl carbonate (DMC), and if necessary vinylene carbonate (VC) at a volume ratio shown in FIG. 4. The content of each electrolyte salt in the electrolytic solution was as shown in Table 4. The area density ratio between the cathode 21 and the anode 22 was designed so that the capacity of the anode 22 was expressed by the capacity component due to insertion and extraction of lithium.

As Comparative examples 4-1 to 4-3 relative to Examples 4-1 to 4-16, secondary batteries were fabricated as in Examples 4-1 to 4-16, except that an electrolytic solution obtained by dissolving as an electrolyte salt, LiPF$_6$, or LiPF$_6$ and difluoro[oxolate-O,O']lithium borate expressed in Chemical formula 10 in a mixed solvent of ethylene carbonate, dimethyl carbonate, and if necessary vinylene carbonate at a volume ratio shown in FIG. 4 was used. Further, as Comparative example 4-4, a secondary battery was fabricated as in Examples 4-1 to 4-16, except that an electrolytic solution obtained by dissolving LiPF$_6$ as an electrolyte salt in a mixed solvent of 4-fluoro-1,3-dioxolan-2-one, which is the cyclic ester carbonate derivative having halogen atom, ethylene carbonate, and dimethyl carbonate at a volume ratio shown in FIG. 4 was used. The content of each electrolyte salt in the electrolytic solution was as shown in Table 4. As a CoSnC-containing material powder, as in Examples 4-1 to 4-14, the tin—cobalt-indium-titanium-carbon containing material was used.

Regarding the obtained lithium ion secondary batteries of Examples 4-1 to 4-16 and Comparative examples 4-1 to 4-4, cycle characteristics were measured as in Examples 1-1 to 1-16. The results are shown in Table 4.

TABLE 4

| | Anode active material | Solvent (volume %) | | | | Electrolyte salt | | Discharge capacity retention ratio (%) |
| | | FEC | EC | DMC | VC | Kind | Content (mol/kg) | |
|---|---|---|---|---|---|---|---|---|
| Example 4-1 | 48Sn—23Co—5In—2Ti—20C | 0.03 | 0.47 | 0.5 | 0 | LiPF$_6$ Chemical formula 10 | 0.8 0.2 | 80.0 |
| Example 4-2 | | 0.08 | 0.42 | 0.5 | 0 | LiPF$_6$ Chemical formula 10 | 0.8 0.2 | 89.0 |
| Example 4-3 | | 0.08 | 0.4 | 0.5 | 0.02 | LiPF$_6$ Chemical formula 10 | 0.8 0.2 | 90.0 |
| Example 4-4 | | 0.12 | 0.38 | 0.5 | 0 | LiPF$_6$ Chemical formula 10 | 0.99 0.01 | 84.0 |
| Example 4-5 | | 0.12 | 0.38 | 0.5 | 0 | LiPF$_6$ Chemical formula 10 | 0.95 0.05 | 88.0 |
| Example 4-6 | | 0.12 | 0.38 | 0.5 | 0 | LiPF$_6$ Chemical formula 10 | 0.9 0.1 | 88.0 |
| Example 4-7 | | 0.12 | 0.38 | 0.5 | 0 | LiPF$_6$ Chemical formula 10 | 0.8 0.2 | 89.0 |
| Example 4-8 | | 0.12 | 0.38 | 0.5 | 0 | LiPF$_6$ Chemical formula 10 | 0.5 0.5 | 86.0 |
| Example 4-9 | | 0.12 | 0.38 | 0.5 | 0 | LiPF$_6$ Chemical formula 10 | 0.2 0.8 | 81.0 |
| Example 4-10 | | 0.12 | 0.38 | 0.5 | 0 | Chemical formula 10 | 1.0 | 78.0 |
| Example 4-11 | | 0.2 | 0.3 | 0.5 | 0 | LiPF$_6$ Chemical formula 10 | 0.8 0.2 | 87.0 |
| Example 4-12 | | 0.5 | 0 | 0.5 | 0 | LiPF$_6$ Chemical formula 10 | 0.8 0.2 | 87.0 |
| Example 4-13 | | 0.8 | 0 | 0.2 | 0 | LiPF$_6$ Chemical formula 10 | 0.8 0.2 | 85.0 |
| Example 4-14 | | 0.12 | 0.38 | 0.5 | 0 | LiPF$_6$ Chemical formula 15 | 0.8 0.2 | 85.0 |
| Example 4-15 | 45Sn—4Si—29Co—20C | 0.12 | 0.38 | 0.5 | 0 | LiPF$_6$ Chemical formula 10 | 0.8 0.2 | 88.0 |
| Example 4-16 | 53.5Sn—25.7Co—19.8C | 0.12 | 0.38 | 0.5 | 0 | LiPF$_6$ Chemical formula 10 | 0.8 0.2 | 82.0 |
| Comparative example 4-1 | 48Sn—23Co—5In—2Ti—20C | 0 | 0.5 | 0.5 | 0 | LiPF$_6$ | 1.0 | 63.0 |
| Comparative example 4-2 | | 0 | 0.5 | 0.5 | 0 | LiPF$_6$ Chemical formula 10 | 0.8 0.2 | 67.0 |
| Comparative example 4-3 | | 0 | 0.48 | 0.5 | 0.02 | LiPF$_6$ Chemical formula 10 | 0.8 0.2 | 66.0 |
| Comparative example 4-4 | | 0.12 | 0.38 | 0.5 | 0 | LiPF$_6$ | 1.0 | 71.0 |

FEC: 4-fluoro-1,3-oxolan-2-one
EC: ethylene carbonate
DMC: dimethyl carbonate
VC: vinylene carbonate
Chemical formula 10: difluoro[oxolate-O,O']lithium borate
Chemical formula 15: tetrakis(trifluoro acetate)lithium borate As evidenced by Table 4, according to Examples 4-7 and 4-14 using the cyclic ester carbonate having halogen atom and the light metal salt expressed in Chemical formula 10 or Chemical formula 15, the discharge capacity retention ratio was improved more than in Comparative example 4-1 not using the both, Comparative examples 4-2 and 4-3 not using the cyclic ester carbonate derivative having halogen atom, or Comparative example 4-4 not using the light metal salt expressed in Chemical formula 10 or Chemical formula 15. Further, in Examples 4-1 to 4-3, 4-11 to 4-13, in which the composition of the solvent was changed, or in Examples 4-15 and 4-16 using other CoSnC-containing material, the high discharge capacity retention ratio was similarly obtained. Further, in Examples 4-4 to 4-6 and 4-8 to 4-10, in which the content of the electrolyte salt expressed in Chemical formula 10 was changed, the high discharge capacity retention ratio was similarly obtained. However, in Examples 4-4 to 4-9 using the mixture of the electrolyte salt expressed in Chemiacetate)lithium borate expressed in Chemical formula 15 as an electrolyte salt in a mixed solvent of ethylene carbonate and dimethyl carbonate at a volume ratio of 1:1 so that tetrakis (trifluoro acetate)lithium borate became 1.0 mol/kg was used.

Regarding the obtained secondary batteries of Example 5-1 and Comparative examples 5-1 and 5-2, cycle characteristics were measured as in Examples 1-1 to 1-16. The results thereof are shown in Table 5.

TABLE 5

| | Anode active material | Solvent | Electrolyte salt | Discharge capacity retention ratio (%) |
|---|---|---|---|---|
| Example 5-1 | Lithium metal + carbon | FEC + dimethyl carbonate | Chemical formula 15 | 84 |
| Comparative example 5-1 | Lithium metal + carbon | FEC + dimethyl carbonate | $LiPF_6$ | 74 |
| Comparative example 5-2 | | Ethylene carbonate + dimethyl carbonate | Chemical formula 15 | 68 |

FEC: 4-fluoro-1,3-oxolan-2-one
Chemical formula 15: tetrakis(trifluoro acetate)lithium borate cal formula 10 and $LiPF_6$, the higher value was obtained than in Example 4-10 using only the electrolyte salt expressed in Chemical formula 10.

That is, it was found that in the case of another lithium ion secondary battery containing an anode material capable of inserting and extracting an electrode reactant and containing at least one of metal elements and metalloid elements as an element, cycle characteristics could be improved as long as the cyclic ester carbonate derivative having halogen atom and the light metal salt expressed in Chemical formula 1 or Chemical formula 2 were used, and cycle characteristics could be more improved when other light metal salt was further mixed in addition to the light metal salt expressed in Chemical formula 1 or Chemical formula 2.

Example 5-1

A secondary battery including the capacity component due to insertion and extraction of lithium and the capacity component due to precipitation and dissolution of lithium, and being expressed by the sum thereof was fabricated. Then, the secondary battery was fabricated as in Examples 1-1 to 1-16, except that artificial graphite was used for the anode material and the anode 22 was formed as in Comparative examples 1-3 to 1-5. For the electrolytic solution, an electrolytic solution obtained by dissolving tetrakis(trifluoro acetate)lithium borate expressed in Chemical formula 15 as an electrolyte salt in a mixed solvent of 4-fluoro-1,3-dioxolan-2-one, which is the cyclic ester carbonate derivative having halogen atom, and dimethyl carbonate at a volume ratio of 1:1 so that tetrakis (trifluoro acetate)lithium borate became 1.0 mol/kg was used. The fill ratios of the cathode material and the anode material were designed so that the capacity of the anode 22 included the capacity component due to insertion and extraction of lithium and the capacity component due to precipitation and dissolution of lithium, and was expressed by the sum thereof.

As Comparative examples 5-1 and 5-2 relative to Example 5-1, secondary batteries were fabricated as in Example 5-1, except that an electrolytic solution obtained by dissolving $LiPF_6$ as an electrolyte salt in a mixed solvent of 4-fluoro-1, 3-dioxolan-2-one, which is the cyclic ester carbonate derivative having halogen atom, and dimethyl carbonate at a volume ratio of 1:1 so that $LiPF_6$ became 1.0 mol/kg was used, or an electrolytic solution obtained by dissolving tetrakis(trifluoro Further, regarding the secondary batteries of Example 5-1 and Comparative examples 5-1 and 5-2, presence of the lithium metal and lithium ions in the anode 22 was examined by visual observation and $^7Li$ nuclear magnetic resonance spectroscopy.

As a result by $^7Li$ nuclear magnetic resonance spectroscopy, in the secondary batteries of Example 5-1 and Comparative examples 5-1 and 5-2, the peak to which the lithium ion belonged was confirmed in the vicinity of 265 ppm in a state of full charge, and the peak to which lithium ion belonged was confirmed in the vicinity of 44 ppm. These peak positions were numeral values to external standard lithium chloride. Meanwhile, in the state of full discharge, the peak to which the lithium metal belonged was not confirmed. Further, the lithium metal was confirmed only in the state of full charge by visual observation as well. That is, it was confirmed that the capacity of the anode 22 included the capacity component due to insertion and extraction of lithium and the capacity component due to precipitation and dissolution of lithium, and was expressed by the sum thereof.

As evidenced by Table 5, as in Examples 1-1 to 1-16, according to Example 5-1 using the cyclic ester carbonate derivative having halogen atom and tetrakis(trifluoro acetate) lithium borate expressed in Chemical formula 15, the discharge capacity retention ratio was improved more than in Comparative example 5-1 not using tetrakis(trifluoro acetate) lithium borate expressed in Chemical formula 15 or Comparative example 5-2 not using the cyclic ester carbonate derivative having halogen atom.

That is, it was found that in the case of the secondary battery in which the capacity of the anode 22 included the capacity component due to insertion and extraction of the light metal and the capacity component due to precipitation and dissolution of the light metal, and was expressed by the sum thereof, cycle characteristics could be improved as long as the cyclic ester carbonate derivative having halogen atom and the light metal salt expressed in Chemical formula 1 or Chemical formula 2 were used.

Examples 6-1 to 6-10

Batteries in which the capacity of the anode 22 was expressed by the capacity component due to insertion and extraction of lithium, that is, so-called lithium metal secondary batteries were fabricated. Then, the battery shown in FIG. 3 was used, and a liquid electrolytic solution was used for the electrolyte.

First, as in Examples 1-1 to 1-16, the cathode 33 and the anode 34 were formed, and the cathode lead 31 and the anode lead 32 were attached. Then, the cathode current collector 33A was a strip-shaped aluminum foil being 12 μm thick.

After that, the cathode 33 and the anode 34 were layered and wound with the separator 35 in between so that the cathode active material layer 33B and the anode active material layer 34B were opposed. The lamination was wound to form a winding body, which is the precursor for the spirally wound electrode body 30.

The obtained winding body was sandwiched between the package members 40 made of a laminated film, and outer peripheries of the package members 40 except for one side were thermal fusion-bonded in a pouched state to contain the winding body inside the package member 40. An electrolytic solution was injected into the package member 40. Then, for the electrolytic solution, an electrolytic solution obtained by dissolving as an electrolyte salt, difluoro[oxolate-O,O'] lithium borate expressed in Chemical formula 10 or tetrakis (trifluoro acetate)lithium borate expressed in Chemical formula 15 in a mixed solvent of a cyclic ester carbonate derivative having halogen atom and dimethyl carbonate at a volume ratio of 1:1 so that difluoro[oxolate-O,O']lithium borate or tetrakis(trifluoro acetate)lithium borate became 1.0 mol/kg was used; or an electrolytic solution obtained by dissolving as an electrolyte salt, difluoro[oxolate-O,O'] lithium borate expressed in Chemical formula 10 or tetrakis (trifluoro acetate)lithium borate expressed in Chemical formula 15 and $LiPF_6$ in a mixed solvent of a cyclic ester carbonate derivative having halogen atom and dimethyl carbonate at a volume ratio of 1:1 so that difluoro[oxolate-O,O'] lithium borate or tetrakis(trifluoro acetate)lithium borate became 0.5 mol/kg and $LiPF_6$ became 0.5 mol/kg was used. As a cyclic ester carbonate derivative having halogen atom, 4-fluoro-1,3-dioxolan-2-one, 4----chloro-1,3-dioxolan-2-one, or 4-bromo-1,3-dioxolan-2-one was used. As a laminated film, a laminated film made of nylon, aluminum, and non-stretch polypropylene from the outside was used. The thickness thereof was respectively 30 μm, 40 μm, 30 μm, being the total to 100 μm.

After the electrolytic solution was injected, the opening of the package member 40 was thermal fusion-bonded and hermetically sealed in the vacuum atmosphere, and thereby the secondary batteries of Examples 6-1 to 6-10 were obtained.

As Comparative example 6-1 relative to Examples 6-1 to 6-10, a lithium metal secondary battery was fabricated as in Examples 6-1 to 6-10, except that an electrolytic solution obtained by dissolving tetrakis(trifluoro acetate)lithium borate expressed in Chemical formula 15 as an electrolyte salt in a mixed solvent of ethylene carbonate and dimethyl carbonate at a volume ratio of 1:1 so that tetrakis(trifluoro acetate)lithium borate became 1.0 mol/kg was used. Further, as Comparative example 6-2, a lithium metal secondary battery was fabricated as in Examples 6-1 to 6-10, except that an electrolytic solution obtained by dissolving $LiPF_6$ as an electrolyte salt in a mixed solvent of 4-fluoro-1,3-dioxolan-2-one, which is the cyclic ester carbonate derivative having halogen atom, and dimethyl carbonate at a volume ratio of 1:1 so that $LiPF_6$ became 1.0 mol/kg was used.

Regarding the obtained secondary batteries of Examples 6-1 to 6-10 and Comparative examples 6-1 and 6-2, cycle characteristics were measured as in Examples 1-1 to 1-16. The results thereof are shown in Table 6.

TABLE 6

| | Anode active material | Solvent | Electrolyte salt Kind | Content (mol/kg) | Discharge capacity retention ratio (%) |
|---|---|---|---|---|---|
| Example 6-1 | Lithium metal | FEC + dimethyl carbonate | Chemical formula 10 | 1.0 | 66 |
| Example 6-2 | | FEC + dimethyl carbonate | Chemical formula 15 | 1.0 | 78 |
| Example 6-3 | | CIEC + dimethyl carbonate | Chemical formula 10 | 1.0 | 80 |
| Example 6-4 | | CIEC + dimethyl carbonate | Chemical formula 15 | 1.0 | 77 |
| Example 6-5 | | BrEC + dimethyl carbonate | Chemical formula 10 | 1.0 | 76 |
| Example 6-6 | | BrEC + dimethyl carbonate | Chemical formula 15 | 1.0 | 67 |
| Example 6-7 | | FEC + dimethyl carbonate | Chemical formula 10 $LiPF_6$ | 0.5 0.5 | 72 |
| Example 6-8 | | FEC + dimethyl carbonate | Chemical formula 15 $LiPF_6$ | 0.5 0.5 | 81 |
| Example 6-9 | | CIEC + dimethyl carbonate | Chemical formula 10 $LiPF_6$ | 0.5 0.5 | 83 |
| Example 6-10 | | CIEC + dimethyl carbonate | Chemical formula 15 $LiPF_6$ | 0.5 0.5 | 78 |
| Comparative example 6-1 | Lithium metal | Ethylene carbonate + dimethyl carbonate | Chemical formula 15 | 1.0 | 45 |
| Comparative example 6-2 | | FEC + dimethyl carbonate | $LiPF_6$ | 1.0 | 55 |

FEC: 4-fluoro-1,3-oxolan-2-one
CIEC: 4-chloro-1,3-oxolan-2-one
BrEC: 4-bromo-1,3-oxolan-2-one
Chemical formula 10: difluoro[oxolate-O,O']lithium borate
Chemical formula 15: tetrakis(trifluoro acetate)lithium borate As evidenced by Table 6, as in Examples 1-1 to 1-16, according to Examples 6-1 to 6-10 using the cyclic ester carbonate having halogen atom and difluoro[oxolate-O,O'] lithium borate expressed in Chemical formula 10 or tetrakis (trifluoro acetate)lithium borate expressed in Chemical formula 15, the discharge capacity retention ratio was improved more than in Comparative example 6-1 not using the cyclic ester carbonate derivative having halogen atom, or Comparative example 6-2 not using difluoro[oxolate-O,O']lithium borate expressed in Chemical formula 10 or tetrakis(trifluoro acetate)lithium borate expressed in Chemical formula 15. Further, as in Examples 2-1 to 2-4, according to Examples 6-7 to 6-10 further using $LiPF_6$ in addition to difluoro[oxolate-O, O']lithium borate expressed in Chemical formula 10 or tetrakis(trifluoro acetate)lithium borate expressed in Chemical formula 15, the discharge capacity retention ratio was respectively improved more than in Examples 6-1 to 6-4 not using $LiPF_6$.

That is, it was found that in the case of using the package member 40 made of a laminated film, cycle characteristics could be improved as long as the cyclic ester carbonate derivative having halogen atom and the light metal salt expressed in Chemical formula 1 or Chemical formula 2 were used, and cycle characteristics could be more improved when other light metal salt was further mixed in addition to the light metal salt expressed in Chemical formula 1 or Chemical formula 2.

The present invention has been described with reference to the embodiments and the examples. However, the present invention is not limited to the embodiments and the examples, and various modifications may be made. For example, in the foregoing embodiments and examples, descriptions have been given of the case using lithium as an electrode reactant. However, the present invention can be applied to the case using other element of Group 1A such as sodium (Na) and potassium (K), an element of Group 2A such as magnesium and calcium (Ca), other light metal such as aluminum, or an alloy of lithium or the foregoing as well, and similar effects can be thereby obtained. Then, for the anode active material, the anode material as described above can be similarly used.

Further, in the foregoing embodiments and examples, descriptions have been given of the case using the electrolytic solution or the gelatinous electrolyte as one of the solid electrolyte. However, other electrolyte may be used. As other electrolyte, for example, a mixture of an ion conductive inorganic compound formed of ion conductive ceramics, ion conductive glass, ionic crystal or the like and an electrolytic solution; or a mixture of the foregoing ion conductive inorganic compound and a gelatinous electrolyte can be cited.

Further, in the foregoing embodiments and examples, descriptions have been given of the secondary battery having the winding structure. However, the present invention can be similarly applied to a secondary battery having a structure in which the cathode and the anode are folded or a secondary battery having a structure in which the cathode and the anode are layered. In addition, the present invention can be applied to a secondary battery such as a so-called coin-type battery, a button-type battery, and a square-type battery. Further, the present invention can be applied not only to the secondary batteries but also to the primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a cathode;
an anode; and
an electrolyte,
wherein an anode active material comprises tin (Sn), cobalt (Co) and carbon (C), and
the electrolyte contains a cyclic ester carbonate derivative having halogen atom and at least one from the group consisting of light metal salts expressed in Chemical formula 1 and Chemical formula 2:

[Chemical formula 1]

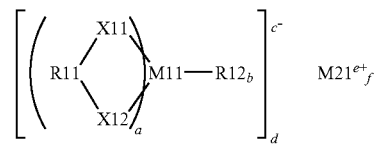

wherein R11 represents —C(=O)—R21-C(=O)-group (R21 represents an alkylene group, an alkylene halide group, an arylene group, or an arylene halide group), —C(=O)—C(R23)(R24)-group (R23 and R24 represent an alkyl group, an alkyl halide group, an aryl group, or an aryl halide group), or —C(=O)—C(=O)-group; R12 represents a halogen group, an alkyl group, an alkyl halide group, an aryl group, or an aryl halide group; X11 and X12 represent oxygen (O) or sulfur (S), respectively; M11 represents a transition metal element, or a 3B Group element, a 4B Group element, or a 5B Group element in the short period periodic table; M21 represents a 1A Group element or a 2A Group element in the short period periodic table or aluminum (Al); a represents an integer number from 1 to 4; b represents an integer number from 0 to 8; and c, d, e, and f represent an integer number from 1 to 3, respectively,

[Chemical formula 2]

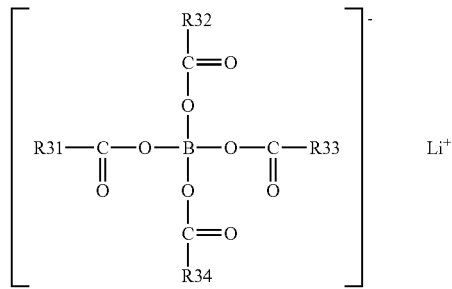

wherein R31, R32, R33, and R34 represent a group obtained by substituting at least part of hydrogen of an alkyl group with halogen.

2. A battery according to claim 1, wherein as the cyclic ester carbonate derivative, a cyclic ester carbonate derivative expressed in Chemical formula 3 is contained, where chemical formula 3 is as follows:

[Chemical formula 3]

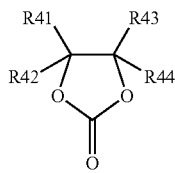

wherein R41, R42, R43, and R44 represent a hydrogen group, a fluorine group, a chlorine group, a bromine group, a methyl group, an ethyl group or a group obtained by substituting part of hydrogen of a methyl group or an ethyl group with a fluorine group, a chlorine group, or a bromine group, and at least one thereof is a group having halogen.

3. A battery according to claim 1, wherein as the light metal salt, a compound expressed in Chemical formula 9 is contained, where chemical formula 9 is as follows:

[Chemical formula 9]

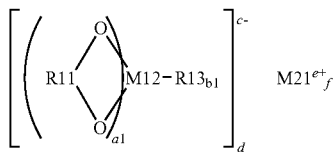

wherein R11 represents —C(=O)—R21-C(=O)-group (R21 represents an alkylene group, an alkylene halide group, an arylene group, or an arylene halide group), —C(=O)—C(R23)(R24)-group (R23 and R24 represent an alkyl group, an alkyl halide group, an aryl group, or an aryl halide group.), or —C(=O)—C(=O)-group; R13 represents a halogen group; M12 represents phosphorus (P) or boron (B); M21 represents a 1A Group element or a 2A Group element in the short period periodic table or aluminum; a1 represents an integer number from 1 to 3; b1 represents 0, 2, or 4; and c, d, e, and f represent an integer number from 1 to 3, respectively.

4. A battery according to claim 1, wherein as the light metal salt, at least one from the group consisting of difluoro[oxolate-O,O']lithium borate expressed in Chemical formula 10, tetrafluoro[oxolate-O,O']lithium phosphate expressed in Chemical formula 11, difluoro bis[oxolate-O,O']lithium phosphate expressed in Chemical formula 12, difluoro[3,3,3-trifluoro-2-oxide-2-trifluoromethyl propionate(2-)-O,O'] lithium borate expressed in Chemical formula 13, bis[3,3,3-trifluoro-2-oxide-2-trifluoromethyl propionate 2-)-O,O'] lithium borate expressed in Chemical formula 14, tetrakis (trifluoro acetate)lithium borate expressed in Chemical formula 15, tetrakis(pentafluoro propanoate)lithium borate expressed in Chemical formula 16, and tetrakis(trichloro acetate)lithium borate expressed in Chemical formula 17 is contained, where chemical formulas 10-17 are as follows:

[Chemical formula 10]

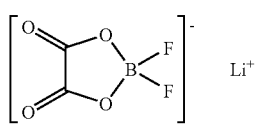

[Chemical formula 11]

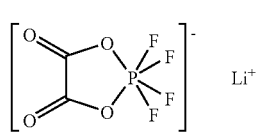

[Chemical formula 12]

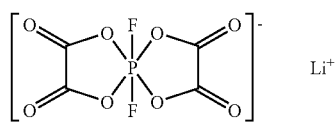

[Chemical formula 13]

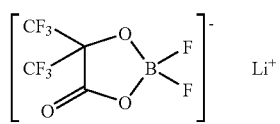

[Chemical formula 14]

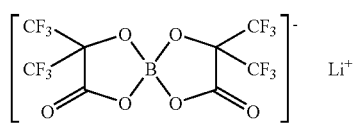

[Chemical formula 15]

LiB(OCOCF$_3$)$_4$

[Chemical formula 16]

LiB(OCOC$_2$F$_5$)$_4$

[Chemical formula 17]

LiB(OCOCCl$_3$)$_4$.

5. A battery according to claim 1, wherein an additional light metal salt is further contained in addition to the light metal salt.

6. A battery according to claim 1, wherein at least one from the group consisting of LiPF$_6$, LiBF$_4$, LiClO$_4$, LiAsF$_6$, lithium salts expressed in Chemical formula 18, and lithium salts expressed in Chemical formula 19 is further contained, where chemical formulas 18 and 19 are as follows:

LiN(C$_m$F$_{2m+1}$SO$_2$)(C$_n$F$_{2n+1}$SO$_2$)  [Chemical formula 18]

wherein m and n are an integer number of 1 or more,

LiC(C$_p$F$_{2p+1}$SO$_2$)(C$_q$F$_{2q+1}$SO$_2$)(C$_r$F$_{2r+1}$SO$_2$)  [Chemical formula 19]

wherein p, q, and r are an integer number of 1 or more.

7. A battery comprising:

a cathode;

an anode; and an electrolyte, wherein a capacity of the anode includes a capacity component due to insertion and extraction of a light metal and a capacity component due to precipitation and dissolution of the light metal, and is expressed by the sum thereof, the anode contains an anode active material comprising tin (Sn), cobalt (Co) and carbon (C), and the electrolyte contains a cyclic ester carbonate derivative having halogen atom and at least one from the group consisting of light metal salts expressed in Chemical formula 1 or Chemical formula 2:

[Chemical formula 1]

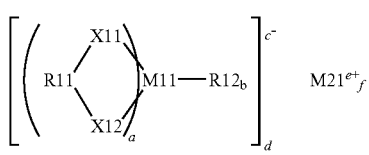

wherein R11 represents —C(=O)—R21-C(=O)-group (R21 represents an alkylene group, an alkylene halide group, an arylene group, or an arylene halide group), —C(=O)—C(R23)(R24)-group (R23 and R24 represent an alkyl group, an alkyl halide group, an aryl group, or an aryl halide group), or —C(=O)—C(=O)-group; R12 represents a halogen group, an alkyl group, an alkyl halide group, an aryl group, or an aryl halide group; X11 and X12 represent oxygen (O) or sulfur (S), respectively; M11 represents a transition metal element, or a 3B Group element, a 4B Group element, or a 5B Group element in the short period periodic table; M21 represents a 1A Group element or a 2A Group element in the short period periodic table or aluminum (Al); a represents an integer number from 1 to 4; b represents an integer number from 0 to 8; and c, d, e, and f represent an integer number from 1 to 3, respectively,

[Chemical formula 2]

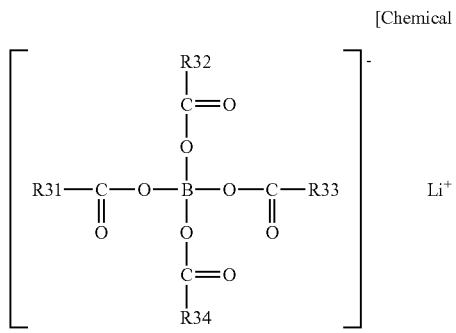

wherein R31, R32, R33, and R34 represent a group obtained by substituting at least part of hydrogen of an alkyl group with halogen.

8. A battery according to claim 7, wherein as the cyclic ester carbonate derivative, a cyclic ester carbonate derivative expressed in Chemical formula 3 is contained, where chemical formula 3 is as follows:

[Chemical formula 3]

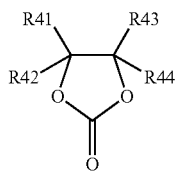

wherein R41, R42, R43, and R44 represent a hydrogen group, a fluorine group, a chlorine group, a bromine group, a methyl group, an ethyl group or a group obtained by substituting part of hydrogen of a methyl group or an ethyl group with a fluorine group, a chlorine group, or a bromine group, and at least one thereof is a group having halogen.

9. A battery according to claim 7, wherein as the light metal salt, a compound expressed in Chemical formula 9 is contained, where chemical formula 9 is as follows:

[Chemical formula 9]

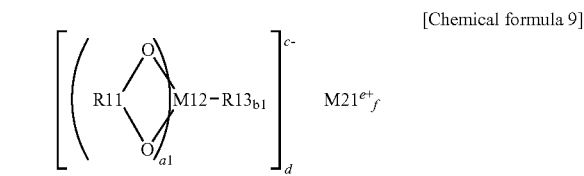

wherein R11 represents —C(=O)—R21-C(=O)-group (R21 represents an alkylene group, an alkylene halide group, an arylene group, or an arylene halide group), —C(=O)—C(R23)(R24)-group (R23 and R24 represent an alkyl group, an alkyl halide group, an aryl group, or an aryl halide group), or —C(=O)—C(=O)-group; R13 represents a halogen group; M12 represents phosphorus (P) or boron (B); M21 represents a 1A Group element or a 2A Group element in the short period periodic table or aluminum; a1 represents an integer number from 1 to 3; b1 represents 0, 2, or 4; and c, d, e, and f represent an integer number from 1 to 3, respectively.

10. A battery according to claim 7, wherein as the light metal salt, at least one from the group consisting of difluoro[oxolate-O,O']lithium borate expressed in Chemical formula 10, tetrafluoro[oxolate-O,O']lithium phosphate expressed in Chemical formula 11, difluoro bis[oxolate-O,O']lithium phosphate expressed in Chemical formula 12, difluoro[3,3,3-trifluoro-2-oxide-2-trifluoromethyl propionate(2-)-O,O'] lithium borate expressed in Chemical formula 13, bis[3,3,3-trifluoro-2-oxide-2-trifluoromethyl propionate(2-)-O,O'] lithium borate expressed in Chemical formula 14, tetrakis (trifluoro acetate)lithium borate expressed in Chemical formula 15, tetrakis(pentafluoro propanoate)lithium borate expressed in Chemical formula 16, and tetrakis(trichloro acetate)lithium borate expressed in Chemical formula 17 is contained, where chemical formulas 10-17 are as follows:

[Chemical formula 10]

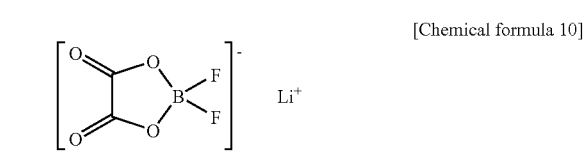

[Chemical formula 11]

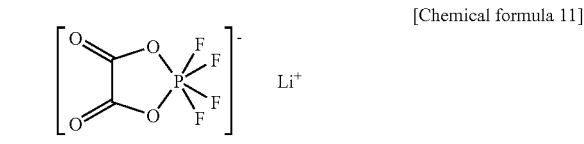

[Chemical formula 12]

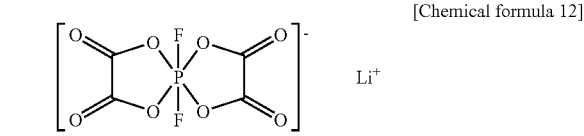

-continued

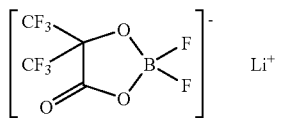

[Chemical formula 13]

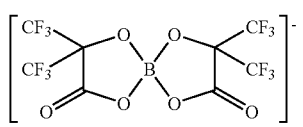

[Chemical formula 14]

LiB(OCOCF$_3$)$_4$ [Chemical formula 15]

LiB(OCOC$_2$F$_5$)$_4$ [Chemical formula 16]

LiB(OCOCCl$_3$)$_4$. [Chemical formula 17]

11. A battery according to claim 7, wherein an additional light metal salt is further contained in addition to the light metal salt.

12. A battery according to claim 7, wherein at least one from the group consisting of LiPF$_6$, LiBF$_4$, LiClO$_4$, LiAsF$_6$, lithium salts expressed in Chemical formula 18, and lithium salts expressed in Chemical formula 19 is further contained, where Chemical formulas 18 and 19 are as follows:

LiN(C$_m$F$_{2m+1}$SO$_2$)(C$_n$F$_{2n+1}$SO$_2$) [Chemical formula 18]

wherein m and n are an integer number of 1 or more,

LiC(C$_p$F$_{2p+1}$SO$_2$)(C$_q$F$_{2q+1}$SO$_2$)(C$_r$F$_{2r+1}$SO$_2$) [Chemical formula 19]

wherein p, q, and r are an integer number of 1 or more.

13. A battery according to claim 1, wherein the anode active material comprises from about 9.9 wt % to 29.7 wt % carbon, the weight ratio of cobalt to the total amount of cobalt and tin (Co/(Co+Sn)) is between 0.30 and 0.70, and the anode active material has a diffraction peak having a wide half width value with a diffraction angle 2θ of 1.0 degree or more, when 2θ ranges from 20 to 50 degrees.

14. A battery according to claim 7, wherein the anode active material comprises from about 9.9 wt % to 29.7 wt % carbon, the weight ratio of cobalt to the total amount of cobalt and tin (Co/(Co+Sn)) is between 0.30 and 0.70, and the anode active material has a diffraction peak having a wide half width value with a diffraction angle 2θ of 1.0 degree or more, when 2θ ranges from 20 to 50 degrees.

* * * * *